United States Patent
Bookstaff

(10) Patent No.: US 7,187,761 B2
(45) Date of Patent: Mar. 6, 2007

(54) METHOD AND SYSTEM FOR PROVIDING ADVERTISING TO TELEPHONE CALLERS

(76) Inventor: Blake Bookstaff, 205 Mohican St., Knoxville, TN (US) 37919

( * ) Notice: Subject to any disclaimer, the term of this patent is extended or adjusted under 35 U.S.C. 154(b) by 5 days.

(21) Appl. No.: 10/303,903

(22) Filed: Nov. 26, 2002

(65) Prior Publication Data

US 2004/0091093 A1    May 13, 2004

Related U.S. Application Data

(60) Provisional application No. 60/424,311, filed on Nov. 7, 2002.

(51) Int. Cl.
*H04M 3/42* (2006.01)
(52) U.S. Cl. .............. 379/201.01; 329/211.01; 329/213.01
(58) Field of Classification Search ........... 379/201.01, 379/204.01, 211.01, 212.01, 213.01
See application file for complete search history.

(56) References Cited

U.S. PATENT DOCUMENTS

| | | | |
|---|---|---|---|
| 4,071,698 A | 1/1978 | Barger, Jr. et al. | |
| 4,232,199 A | 11/1980 | Boatwright et al. | |
| 4,446,337 A | 5/1984 | Cofer | |
| 4,654,482 A | 3/1987 | DeAngelis | |
| 4,791,666 A | 12/1988 | Cobb et al. | |
| 4,850,007 A * | 7/1989 | Marino et al. ............... | 379/67 |
| 4,897,866 A | 1/1990 | Majmudar et al. | |
| 4,943,995 A | 7/1990 | Daudelin et al. | |
| 5,131,024 A | 7/1992 | Pugh et al. | |
| 5,425,097 A | 6/1995 | Pula | |
| 5,448,625 A * | 9/1995 | Lederman .................... | 379/67 |
| 5,475,746 A | 12/1995 | Miller et al. | |
| 5,485,511 A | 1/1996 | Iglehart et al. | |
| 5,515,098 A | 5/1996 | Carles | |
| 5,544,236 A | 8/1996 | Andruska et al. | |
| 5,619,562 A | 4/1997 | Maurer et al. | |
| 5,642,407 A * | 6/1997 | He .............................. | 379/87 |

(Continued)

OTHER PUBLICATIONS

Ariana Eunjung Cha, "Showdown at the Digital Corral," The Washington Post, Apr. 22, 2001, p. H1, 2 pages.

*Primary Examiner*—William J. Deane, Jr.
(74) *Attorney, Agent, or Firm*—Lesavich High-Tech Law Group, P.C.

(57) ABSTRACT

A system and method for providing one or more advertisements, services, surveys, offers for goods/services, and/or offers to modify a telephone service plan ("intercept actions" collectively) to one or more parties to a telephone call are provided. One or more advertisements may be provided during one or more points along an unsuccessful or successful telephone call. One or more services may be provided gratuitously or in exchange for the presentation of one or more advertisements to recipient of the service. Additionally, a telephone service plan associated with the caller or callee may be analyzed and the caller/callee may be presented with the option to activate one or more service features that, at the time of the attempted call, are not activated in the telephone service plan. A survey may be provided to the caller/callee and the responses recorded. The caller/callee may also receive an offer for goods or services. These intercept actions may be provided during any of a plurality of points along a telephone call, such as prior to dialing; before, after or during a busy signal or ring tones; after one party disconnects but prior to the remaining party or parties disconnecting; and the like.

27 Claims, 13 Drawing Sheets

U.S. PATENT DOCUMENTS

| | | | |
|---|---|---|---|
| 5,652,784 A | 7/1997 | Blen et al. | |
| 5,701,419 A * | 12/1997 | McConnell | 705/27 |
| 5,734,710 A | 3/1998 | Hirth et al. | |
| 5,751,802 A | 5/1998 | Carr et al. | |
| 5,852,775 A | 12/1998 | Hidary | |
| 5,880,770 A | 3/1999 | Ilcisin et al. | |
| 5,892,820 A | 4/1999 | Armstrong et al. | |
| 5,983,544 A | 11/1999 | Fagan | |
| 5,987,424 A | 11/1999 | Nakamura | |
| 6,031,904 A | 2/2000 | An et al. | |
| 6,038,307 A | 3/2000 | Fahrer et al. | |
| 6,061,439 A | 5/2000 | Bleile et al. | |
| 6,084,628 A * | 7/2000 | Sawyer | 725/34 |
| 6,104,786 A | 8/2000 | Gibilisco et al. | |
| 6,118,860 A | 9/2000 | Hillson et al. | |
| 6,178,446 B1 | 1/2001 | Gerszberg et al. | |
| 6,188,751 B1 | 2/2001 | Scherer | |
| 6,205,215 B1 | 3/2001 | Dombakly | |
| 6,301,342 B1 | 10/2001 | Ander et al. | |
| 6,310,948 B1 | 10/2001 | Nemeth | |
| 6,324,273 B1 | 11/2001 | Alcott | |
| 6,353,852 B1 | 3/2002 | Nestoriak, III et al. | |
| 6,381,320 B1 | 4/2002 | Creamer et al. | |
| 6,400,804 B1 * | 6/2002 | Bilder | 379/76 |
| 6,456,709 B1 | 9/2002 | Cox et al. | |
| 6,473,612 B1 | 10/2002 | Cox et al. | |
| 6,504,912 B1 | 1/2003 | Glossbrenner | |
| 6,587,138 B1 | 7/2003 | Vogt et al. | |
| 6,590,970 B1 | 7/2003 | Cai et al. | |
| 6,597,769 B2 | 7/2003 | Snow | |
| 6,614,896 B1 * | 9/2003 | Rao | 379/209.01 |
| 6,618,474 B1 * | 9/2003 | Reese | 379/142.17 |
| 6,718,551 B1 * | 4/2004 | Swix et al. | 725/32 |
| 2001/0012344 A1 | 8/2001 | Kwon | |
| 2002/0044639 A1 | 4/2002 | Shioda et al. | |
| 2002/0049968 A1* | 4/2002 | Wilson et al. | |
| 2002/0051521 A1 | 5/2002 | Patrick | |
| 2002/0091566 A1 | 7/2002 | Siegel | |
| 2002/0107730 A1* | 8/2002 | Bernstein | |
| 2002/0193095 A1* | 12/2002 | Hutcheson et al. | |
| 2002/0194061 A1 | 12/2002 | Himmel et al. | |
| 2003/0007620 A1 | 1/2003 | Elsey et al. | |
| 2003/0033198 A1 | 2/2003 | Flannery et al. | |
| 2003/0050837 A1 | 3/2003 | Kim | |
| 2003/0063721 A1 | 4/2003 | Hirose | |
| 2003/0161464 A1* | 8/2003 | Rodriguez et al. | |
| 2003/0177063 A1 | 9/2003 | Currans et al. | |
| 2003/0231754 A1* | 12/2003 | Stein et al. | |

* cited by examiner

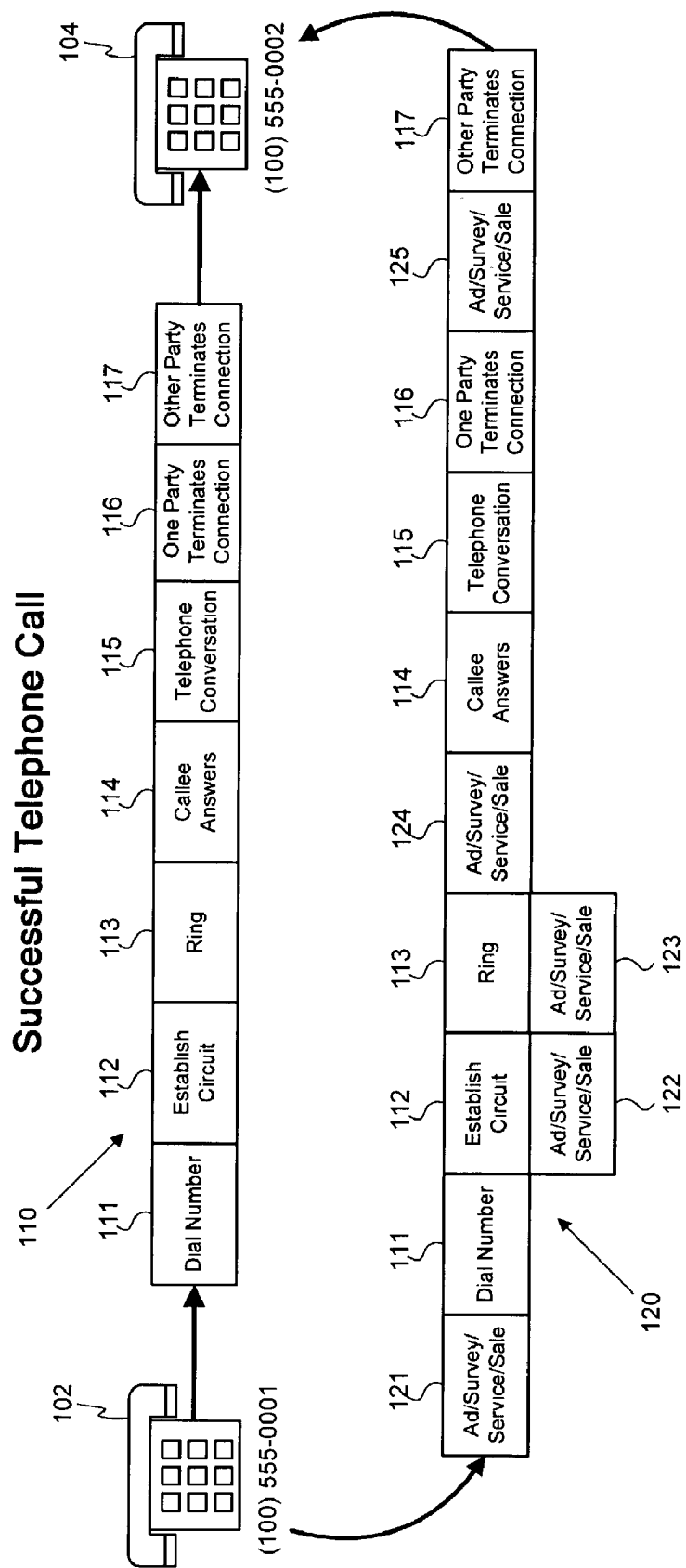

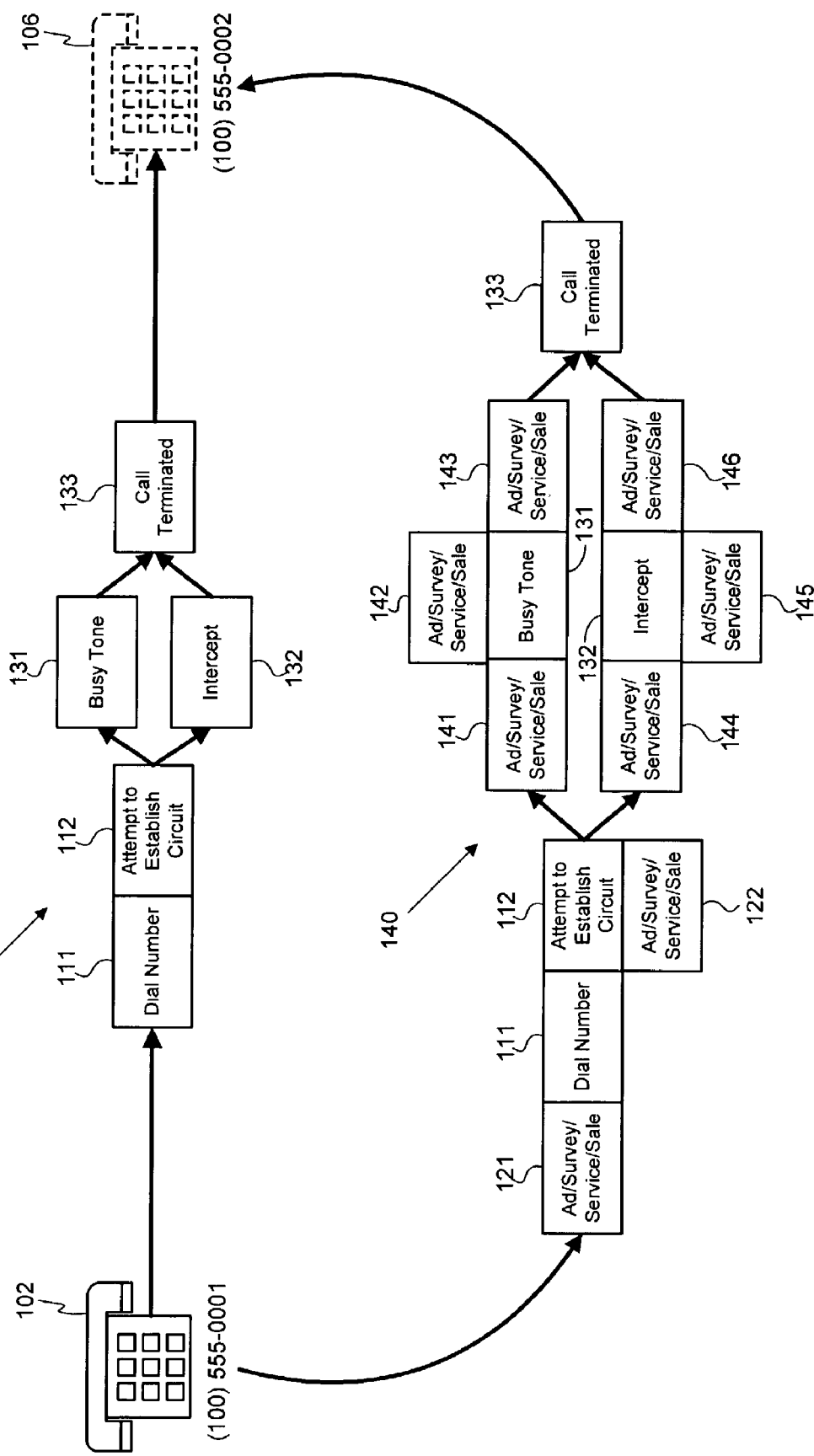

METHOD AND SYSTEM FOR PROVIDING ADVERTISING TO TELEPHONE CALLERS

CROSS-REFERENCE TO RELATED APPLICATIONS

This application claims benefit of U.S. Provisional Application No. 60/424,311 entitled "Method and System For Providing Advertising to Telephone Callers," filed Nov. 7, 2002.

FIELD OF THE INVENTION

The present invention relates generally to intercepting telephone calls, and more particularly to providing one or more advertisements, services, surveys, offers for goods/services and/or offers to modify a telephone service plan to a party to an intercepted telephone call.

BACKGROUND OF THE INVENTION

A number of techniques have been developed to provide advertising and/or certain services via telephone. For example, a company may hire telemarketers to contact potential customers via telephone to inform the potential customers of a product or service available through the company, to conduct a survey, to solicit a donation, to provide movie listings or weather alerts, and the like. However, most people find these unsolicited phone calls to be annoying as they often interrupt people who are otherwise involved at the time of the call. The recipient of the call further may be disinclined to attentively listen to the telephone solicitation, resulting in both an irritated call recipient and an ineffective presentment by the caller.

In view of the limitations of known methods for providing advertising or services via telephone, a system and method for providing advertising and/or services via telephone in a manner more acceptable to a caller would be advantageous.

SUMMARY OF THE INVENTION

The disclosed technique mitigates or solves the above-identified limitation in known implementations, as well as other unspecified deficiencies in the known implementations.

In accordance with one embodiment of the present invention, a method for advertising to a party to a telephone call is provided. The method comprises the steps of intercepting the telephone call and providing at least one intercept action to the party during the interception of the telephone call. The intercept action(s) may include advertisements, services, offers for sales of goods and/or services, offers to modify a telephone service plan, the provision of a survey and obtaining survey responses, and the like.

In a telephone network, a system for providing one or more intercept actions to a party to a telephone call is provided in accordance with another embodiment of the present invention. The system comprises an intercept module being adapted to intercept the telephone call and means for providing at least one intercept action to the party during the intercept of the telephone call. The intercept action(s) may include advertisements, services, offers for sales of goods and/or services, offers to modify a telephone service plan, the provision of a survey and obtaining survey responses, and the like.

Still further features and advantages of the present invention are identified in the ensuing description, with reference to the drawings identified below.

BRIEF DESCRIPTION OF THE DRAWINGS

The purposes and advantages of the present invention will be apparent to those of ordinary skill in the art from the following detailed description in conjunction with the appended drawings in which like reference characters are used to indicate like elements.

FIG. 1 is a block diagram illustrating various points during a telephone call where one or more advertisements, services, surveys, offers for goods/services, and/or offers to activate telephone service features may be provided to one or more parties to the telephone call in accordance with at least one embodiment of the present invention.

DETAILED DESCRIPTION OF THE PREFERRED EMBODIMENTS

Figure 2:
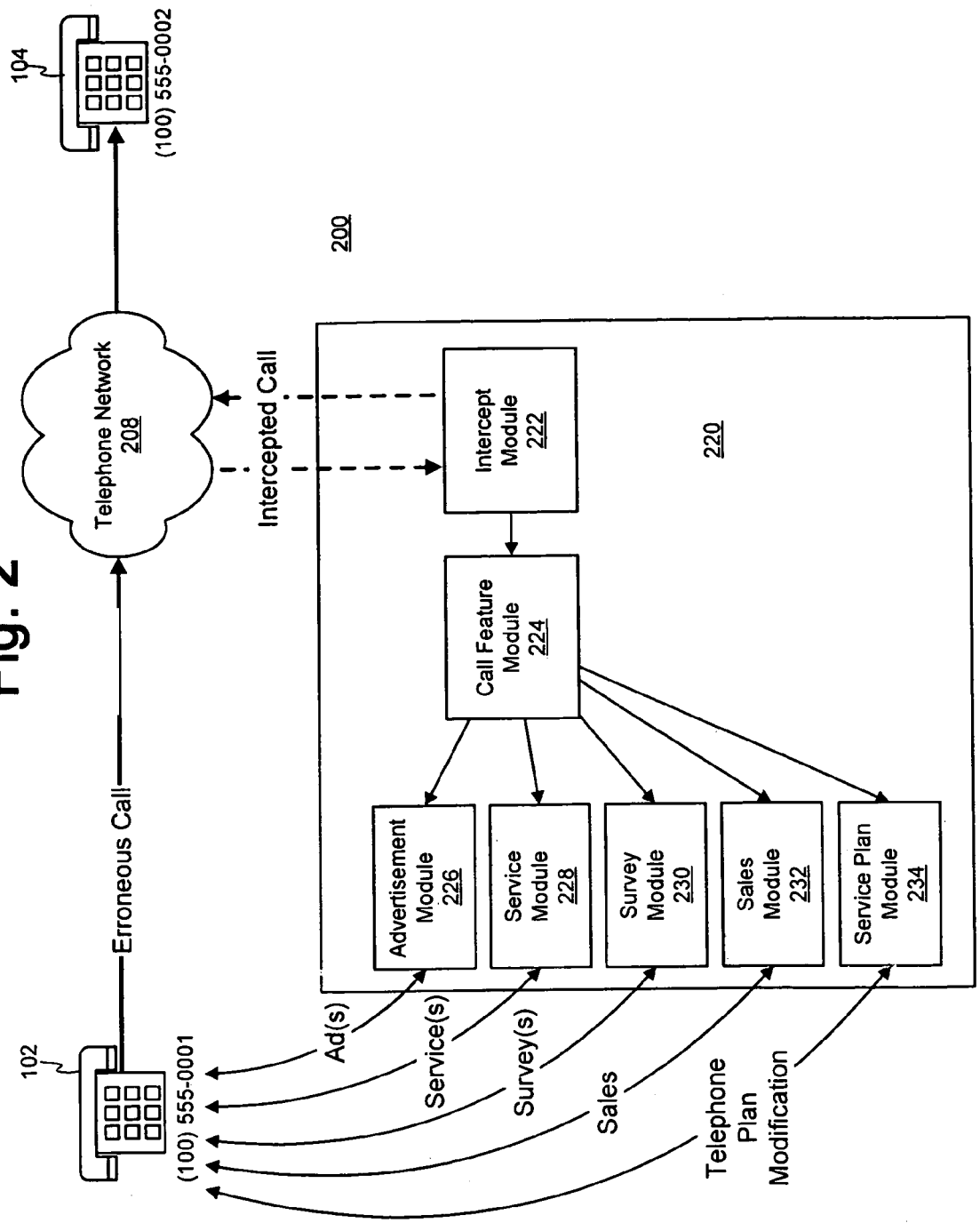
FIG. 2 is a schematic diagram illustrating an exemplary system for providing one or more advertisements, services, surveys, offers for goods/services, and/or offers to activate telephone service features to one or more parties to an intercepted telephone call in accordance with at least one embodiment of the present invention.

FIGS. 1–12 illustrate exemplary systems and methods for providing one or more advertisements, services, surveys, offers for goods/services, and/or offers to modify a telephone service plan ("intercept actions" collectively) to one or more parties to a telephone call are provided. One or more advertisements may be provided during one or more points along an unsuccessful or successful telephone call. One or more services may be provided gratuitously or in exchange for the presentation of one or more advertisements to the recipient of the service. Additionally, a telephone service plan associated with the caller or callee may be analyzed and the caller/callee may be presented with the option to activate one or more service features that, at the time of the attempted call, are not activated in the telephone service plan. A survey may be provided to the caller/callee and the responses recorded. The caller/callee may also receive an offer for goods or services. These intercept actions may be provided during any of a plurality of points along a telephone call, such as prior to dialing; before, after or during a busy signal or ring tones; after one party disconnects but prior to the remaining party or parties disconnecting; and the like.

The terms "telephone" and "telephony equipment," as used herein, refer to any of a variety of devices adapted to originate a connection to another device and/or accept a connection from another device via a telephone network, where a telephone network can include a private telephone network, such as private branch exchange (PBX), a public switched telephone network (PSTN), an integrated services digital network (ISDN), a fiber distributed data interface (FDDI) telephone network, a cellular or wireless telephone network, a satellite telephone network, and the like, or a combination thereof. Likewise, telephone calls may be placed using digital data networks, such as the Internet, and hybrid telephone/digital data networks using techniques such as the "voice over internet protocol" (VoIP) and "voice over digital subscriber line" (VDSL). Accordingly, a telephone network in accordance with the present invention can include a digital data network conventionally used to carry various types of data, for example, the Internet or a local area network (LAN). Likewise, in this case, a telephone can include a device capable of communicating with a digital data network, for example, a networked personal computer implementing a VoIP software application. For ease of discussion, the implementations of the present invention will be discussed herein with reference to a circuit switched telephone network, such as a PSTN. However, the implementations of the present invention may be adapted to other types of telephone networks using the guidelines provided herein.

The terms "to place a telephone call" or "to make a call" and their variations, as used herein, are intended to refer to the act of a caller signaling to a telephone network that a connection is desired between the telephone device of the caller and the telephone device associated with the dialed telephone number. The caller can include a person using a telephone device or an apparatus adapted to place telephone calls, such as an autodialer or telephone-enabled computer. The term telephone number, as used herein, refers to any of a variety of current or proposed telephony addressing/numbering schemes. Such telephone addressing/numbering schemes can include the widely-used international telephone number plan specified by International Telecommunications Union-Telecommunication Standardization (ITU-T) Recommendation E.164 or the combination telephone number/Internet Protocol address (or "ENUM") proposed by the Internet Engineering Task Force's Request for Comments (RFC) 2916.

The term "successful telephone call" and its variants, as used herein, refer to a telephone call that is successfully placed and completed. Conversely, an "unsuccessful telephone call" includes an attempted telephone call that cannot be completed for any of a variety of reasons, and may include an erroneous telephone call (i.e., a telephone call that is unable to be completed due to an error or malfunction) or a telephone call that can be completed but is unanswered or is connected to a busy line. A caller attempting to place an unsuccessful call is herein referred to as an "unsuccessful caller." The attempted telephone call can include, but is not limited to, a local telephone call, a toll call (e.g., 900-XXX-XXXX), a toll-free call (i.e., 800-XXX-XXX, 888-XXX-XXXX, etc.), a long distance call, an international call, and the like.

One common reason for an attempted telephone call that cannot be completed includes an attempted call to an unavailable telephone number, such as a telephone number that is disconnected, out of order, reserved for future use, unavailable from the caller's area code, etc. Other reasons can include, but are not limited to: the caller failed to enter a "1", "0", area code and/or country prefix before the number; the caller entered a "1", "0", area code and/or country prefix before the number when unnecessary; the area code/country prefix is incorrect or unavailable; the dialed telephone number is not a complete telephone number (e.g., dialing only six of seven digits for a local call); the dialed telephone number is not implemented by the telephone network or carrier (herein a "non-existent" telephone number), such as certain sequences of telephone digits (e.g., 800-1XX-XXXX and 800-0XX-XXXX), numbers that do not exist (065-558-9594), or telephone numbers having area codes/country prefixes that are not yet implemented (e.g., 999-XXX-XXXX); and the like.

An unsuccessful telephone call also can include an attempted call to a valid telephone number but for any of a variety of reasons cannot be completed. For instance, an unsuccessful telephone call can include an attempted long-distance telephone call to a valid telephone number originating from a telephone that has not been assigned a long-distance carrier and, therefore, cannot be connected. Similarly, an unsuccessful telephone call can include an attempted phone call to a valid telephone number that cannot be connected due to the telephone carrier. For example, the dialed telephone number could be assigned to a party but not yet connected by the telephone carrier (e.g., the telephone number has a carrier CIC code in the record but the telephone carrier has not yet programmed its switches to route the call to the dialed number).

An unsuccessful telephone call also may include an attempted telephone call that is successfully connected but remains unanswered by the called party after a certain period of time or a certain number of telephone rings. For example, if a caller were to place a call to a telephone number, the call could be an attempted call for the first N rings, whereas after the first N rings the telephone call becomes an unsuccessful telephone call. The value of N could be set by the caller, the recipient of the call, the telephone service provider, and the like. An unsuccessful telephone call also can include an attempted call to a valid telephone number that is currently connected to another call (i.e., the "line is busy"). In such instances, the telephone carrier typically would intercept the call and provide a busy signal to the caller or direct the caller to the called party's voice mail. An unsuccessful telephone call also may include a telephone call that has not yet been attempted but is intercepted by the telephone carrier. To illustrate, telephone carriers often employ a timeout algorithm to detect instances when a caller has not dialed a number within a certain time from when the telephone device was taken "off hook" or when a caller does not dial in all of the digits of the telephone number within a predetermined time. While a number of exemplary types of unsuccessful telephone calls have been illustrated above, an unsuccessful telephone call, as defined herein, can include any of a variety of attempted telephone calls commonly intercepted by a telephone carrier for any of a variety of reasons without departing from the spirit or the scope of the present invention.

Referring now to FIGS. 1A and 1B, flow diagrams illustrating exemplary timings for providing advertisements, surveys, services, and/or sales during a successful telephone call (FIG. 1A) or an unsuccessful telephone call (FIG. 1B) are illustrated in accordance with at least one embodiment of the present invention. Call event sequence 110 of FIG. 1A illustrates an exemplary call event sequence when a successful telephone call is placed from a caller's telephone 102 to a callee's telephone 104. Typically, the call event sequence 110 initiates at event 111 wherein the caller takes telephone 102 "off-hook" and dials a telephone number. During and after the telephone number is dialed, the telephone carrier for telephone 102 attempts to establish a circuit between the telephone 102 and telephone 104 (event 112). Once the circuit is established, the telephone 104 notifies the callee of the incoming telephone call (e.g., the telephone "rings"). At event 114, the callee answers the telephone 104 and the conversation commences at event 115. At the end of the conversation, one of the parties to the phone call (either the caller or the callee) places the corresponding telephone "off-hook" (i.e., the party "hangs up") at event 116 and the remaining party or parties also place their telephones "off-hook" shortly thereafter (event 117).

Intercept event sequence 120 of FIG. 1A illustrates a plurality of opportunities to intercept the successful telephone call and provide one or more advertisements, surveys, services, and/or offers for the sale of goods or services to the parties to the telephone call represented by the call event sequence 110. Advertisements, surveys, services, and offers for the sale of goods or services are herein collectively referred to as "intercept actions." To illustrate, at intercept event 121, the telephone call also could be intercepted prior to the caller dialing a number. In this case, one or more intercept actions could be provided to the caller in addition to, or instead of, a dial tone. Likewise, one or more intercept actions could be provided to the caller while a circuit is being established (intercept event 122). One or more intercept actions could be provided to the caller while the called telephone is "ringing." In this case, the intercept action may overlay "ringing" of the telephone, provided in between rings, etc. As illustrated by intercept event 124, the call could be intercepted and one or more intercept actions could be provided to the caller, the callee, or both, after the callee answers but prior to the commencement of a telephone conversation between caller and callee. Further, the call could be intercepted and one or more intercept actions could be provided to the remaining party (or parties) to the call after another party terminates its end of the telephone connection.

Call event sequence 130 of FIG. 1B illustrates an exemplary call event sequence when an unsuccessful telephone call is attempted from a caller's telephone 102 to a callee's telephone 106. Typically, the call event sequence 130 initiates at event 111 wherein the caller takes telephone 102 and dials a telephone number. Once the telephone number is dialed, the telephone carrier for telephone 102 attempts to establish a circuit between the telephone 102 and telephone 106 (event 112). If the circuit may be established but the call cannot be completed for whatever reason (i.e., the line is busy), the telephone carrier typically intercepts the telephone call and plays a busy tone back to the caller (event 131). Upon hearing the busy tone, the caller typically takes telephone 102 "off-hook" and the call is terminated (event 133). Alternatively, if the circuit cannot be completed for any of a variety of reasons, the telephone carrier typically intercepts the telephone call (event 132) and plays back a prerecorded message to the caller that may indicate to the caller the reason that their call was unable to be completed. The caller then can terminate the call (event 133) by taking the telephone 102 "off-hook."

Intercept event sequence 140 of FIG. 1B illustrates a plurality of opportunities to intercept the unsuccessful telephone call and provide one or more intercept actions (advertisements, surveys, services, sales of goods/services) to the parties to the telephone call represented by the call event sequence 130. Prior to dialing, an unsuccessful telephone call could be intercepted and one or more intercept actions provided to the caller (event 121). While the telephone carrier attempts to establish the circuit, one or more intercept actions could be provided (event 122). Prior to the busy tone (if the line is busy) or prior to the playback of the intercept message (if the circuit cannot be completed), one or more intercept actions may be provided to the caller (events 141, 144, respectively). For example, during the busy tone or intercept message, one or more intercept actions may be provided to the caller (events 142, 145, respectively). Alternatively, one or more intercept actions (events 143, 146) may be provided to the caller after the playback of the busy tone/intercept message but prior to the caller terminating the unsuccessful telephone call.

Further, in one embodiment, the caller may be offered the option of being placed on hold until the line is no longer busy. For instance, the intercept module 222 could play the message: "The line is busy. Would you like to hold?" and upon acceptance of this option (e.g., the caller presses a key associated with acceptance), the caller is placed on hold until the callee's line is freed. While on hold, one or more intercept actions may be provided to the caller. Additionally, while the caller is on hold, the callee may receive, for instance, a series of audible tones indicating that the caller is on hold awaiting the callee.

In at least one embodiment, the exemplary systems and methods described herein may be adapted to provide one or more intercept actions at one or more of the potential intercept events during a successful or unsuccessful telephone call. For example, one intercept action could be provided prior to the caller dialing a telephone number and another intercept action could be provided to the remaining party after one party hangs up. While a number of potential intercept events during successful and unsuccessful telephone calls have been illustrated, using the guidelines provided herein, other potential intercepts events may be utilized by those skilled in the art without departing from the spirit or the scope of the present invention.

Referring now to FIG. 2, an exemplary system for providing advertising and/or services is illustrated in accordance with at least one embodiment of the present invention. FIG. 2 illustrates a system 200 as implemented for providing one or more intercept actions to a caller or callee during a successful telephone call or to a caller during an unsuccessful telephone call. As described in FIG. 1A, a successful call may be intercepted and one or more intercept actions may be provided, for instance, at one of the following times: prior to the caller dialing; after the caller dialed but before a conversation initiates; before, during or after the callee's telephone ringing; or after one party terminates the call but prior to termination by the remaining party or parties. As described in FIG. 1B, an unsuccessful call may be intercepted and one or more intercept actions provided, for instance: prior to the caller dialing; while a circuit is attempted to be established; before, during, or after a busy tone or intercept message playback; or at other points during a call.

In the illustrated example of FIG. 2, the exemplary system 200 includes an originating telephone 102, a telephone network 208 (e.g., a PSTN), and an advertising/service intercept action system 220 having an intercept module 222, a call feature module 224, and one or more of advertisement module 226, a service module 228, a survey module 230, a sales module 232, and a service plan module 234.

In general, when a caller places a call to a destination telephone number, the telephone network attempts to create a circuit between the originating telephone and the destination telephone. This circuit typically passes through a local central office connected to the originating telephone, through one or more trunk lines and other central offices, until it reaches the remote central office connected to the destination telephone. Additionally, if the call is a long-distance telephone call, the circuit may route through the local point-of-presence and remote point-of-presence of the long distance carrier. To illustrate, if a caller at telephone number (100) 555-0001 (telephone 102) attempts to make a long-distance call to the telephone number (100) 555-0002 (telephone 104), then the circuit between the originating telephone 102 and the destination telephone 104 could include a local central office (also known as a local exchange carrier or LEC), a local point-of-presence, the telephone network 208, a remote pointof-presence, and a remote central office connected to the telephone 104. Alternatively, if the telephone 102 and the telephone 104 were connected to the same central office, the call circuit typically would only include the common central office. Similarly, if the telephone 102 and the telephone 104 were local to one another but having different central offices, then the call circuit typically would include at the two central offices without requiring routing through a long-distance carrier network. It should be understood that the circuits discussed above are exemplary only and represent a simplified depiction of the routing associated with such networks.

At one or more designated events during a telephone call, the system 200 may be adapted to intercept the telephone call. In one embodiment, a switch or other device of the telephone network 208, intercepts the telephone call at a desired point during the call and routes the call to the intercept module 222. Any of a variety of mechanisms for intercepting and routing telephones calls within a telephone network are known to those skilled in the art, and any of these methods may be utilized in accordance with the present invention. For example, a Signaling System 7 (SS7) switching mechanism or a Dual Tone Multifrequency (DMTF) switching mechanism may be utilized to route the telephone call to a new destination (i.e., the intercept module 222).

The telephone call may be intercepted in any of a variety of points on the telephone network 208. To illustrate, if the telephone call is to a local number, the call could be intercepted at the local central office. Alternatively, if a long-distance call were attempted, the telephone call could be intercepted at the local central office, the local point-of-presence for the long-distance carrier, at the remote point-of-presence for the long-distance carrier, at the remote central office, etc. Similarly, if the telephone call traverses a number of different telephone network segments owned/operated by different entities, the telephone call could be intercepted at any of the transfer points between these different telephone network segments.

For an intercepted successful telephone call, the intercept module 222, in one embodiment forwards the intercepted call directly to the call feature module 224. For an unsuccessful telephone call, however, conventional intercept systems typically would inform the unsuccessful caller as to the status of the dialed number by playing a recorded or synthesized voice message and then disconnect the caller, thereby freeing up the components of the circuit for use in other calls. Likewise, the intercept module 222 may be adapted to inform an unsuccessful caller of the status of the unavailable number by, for example, playing a prerecorded message or voice-synthesized message. However, rather than disconnecting the unsuccessful caller, in at least one embodiment, the intercept module 222 is adapted to forward the call to the call feature module 224.

The call feature module 224, in one embodiment, is adapted to determine one or more call features associated with the intercepted telephone call. The call feature(s) can include features associated with the originator of the intercepted call, such as the caller's telephone number, the geographical location of the caller, the type of caller (i.e., business/private, type of business, etc.), previous calls made from the telephone 102 of the caller, services activated or deactivated in the telephone service plan of the caller, the type of telephone device used (i.e., cellular or land-line) and the like. The call feature(s) also may include features associated with the intended callee, if one exists. For example, an unavailable telephone number (telephone 104) could be associated with a current or previous subscriber. In this case, the call feature(s) of the destination telephone number can include features associated with the current or previous subscriber, such as the subscriber's geographical location, type of subscriber, previous calls made from/to telephone 104, telephone device type, and the like. In addition, the call feature(s) determined by the call feature module 224 could include features of the intercepted call itself, such as the time and/or date that the intercepted call is placed, the carrier(s) of the telephone call, and the like.

After determining the one or more call features of the intercepted call, the intercepted call is forwarded to one or more of the modules 226–234. As discussed in greater detail with reference to FIGS. 3–4, the intercept action system 220, in one embodiment, is adapted to provide one or more intercept actions to the intercepted caller and/or callee. Recall that, in at least one embodiment, intercept actions can include the provision of one or more advertisements, the taking of one or more surveys, the provision of one or more services to the caller/callee, the modification of a telephone service plan of the caller or callee, the sale of goods and/or services, and the like. For ease of illustration, the provision of intercept actions is discussed herein in the context of providing one or more intercept actions to a caller. Those skilled in the art, however, can readily adapt the various embodiments of the present invention to provide one or more intercept actions to a callee or to both caller and callee, using the guidelines provided herein. Accordingly, reference to providing one or more intercept actions to a caller also applies to providing one or more intercept actions to a callee unless otherwise noted.

The advertisement module 226, in one embodiment, is adapted to provide one or more advertisements to the intercepted caller. The advertisement module 226 is discussed in greater detail with reference to FIGS. 3 and 4. The service module 228 is adapted to provide one or more services to the intercepted caller, preferably to induce the intercepted caller to listen to one or more advertisements from the advertisement module 226. The service module 228 is discussed in greater detail with reference to FIGS. 5 and 6. The survey module 230, in one embodiment, is adapted to provide one or more surveys to the intercepted caller. As with the services provided to induce an intercepted caller to listen to one or more advertisements, the services module 228 may be utilized to provide one or more services to the intercepted caller in exchange for the caller's participation in the one or more surveys. The survey module 230 is illustrated in greater detail with reference to FIGS. 7 and 8. The sales module 232, in one embodiment, is adapted to facilitate a sales transaction with the intercepted caller for the sale of one or more goods and/or services. The advertisement module 226 may be used in conjunction with the sales module 232 to provide advertising to the intercepted caller for the goods/services offered by the sales module 232. The sales module 232 is discussed in greater detail with reference to FIGS. 9 and 10. Further, in at least one embodiment, the service plan module 234 is adapted to facilitate a modification in the telephone service plan of the intercepted caller. As with the sales module 232, the advertising module 226 may be utilized to provide advertising for telephone plan features offered to the intercepted caller. The service plan module 234 is illustrated in greater detail with reference to FIGS. 11 and 12.

The presentment of intercept actions, including advertisement(s), service(s), survey(s), offers for the sales of goods/services, offers to modify a telephone service plan, and the like, to a caller attempting to call an unavailable number, as described herein, may be considered to be less intrusive than conventional techniques for advertising or solicitation by telemarketers or other entities. While these conventional techniques typically interrupt a person's activities with an unsolicited phone call, the provision of advertisements/services during a telephone call initiated by the caller typically is relatively unobtrusive to the caller, as the caller initiated the telephone call. Accordingly, since the caller was not bothered by an unsolicited phone call, the intercepted caller may be more inclined to listen to an advertisement, participate in a survey, consider an offer for the sale of goods/services, or consider an offer for an upgrade in the caller's telephone service plan. Similarly, a callee is less likely to view the intercept actions as intrusive, as the caller was already a party to the telephone call rather than being interrupted.

Figure 3:
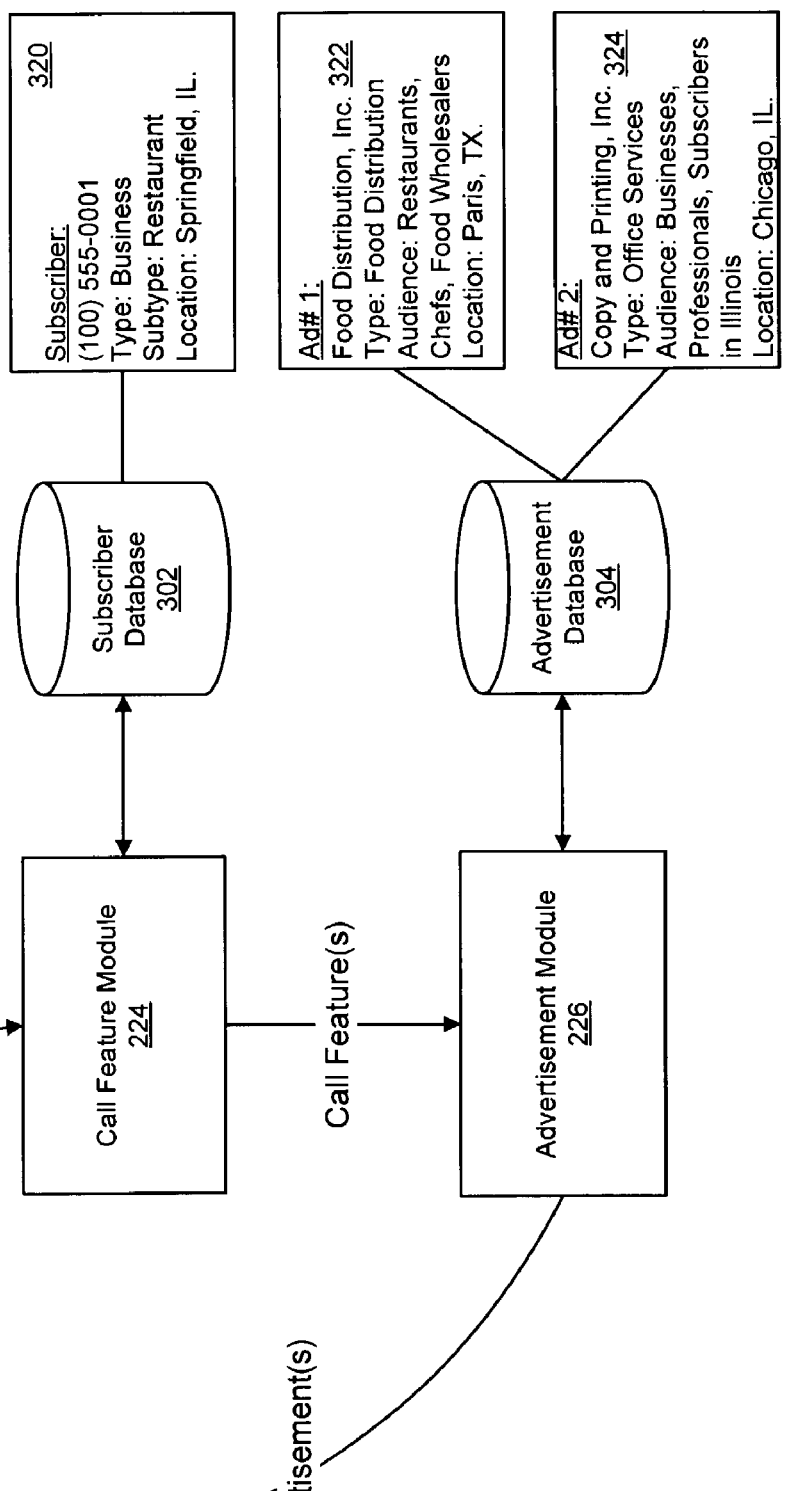
FIG. 3 is a schematic diagram illustrating an exemplary system for providing one or more advertisements to one or more parties to an intercepted telephone call in accordance with at least one embodiment of the present invention.
Figure 4:
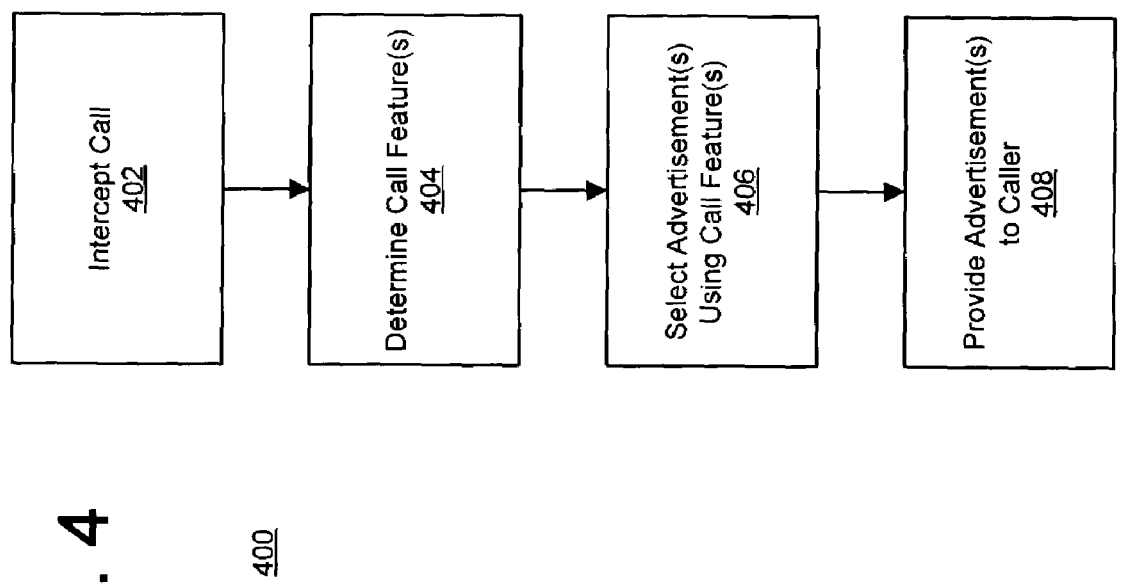
FIG. 4 is a flow diagram illustrating an exemplary method for providing one or more advertisements to one or more parties to an intercepted telephone call in accordance with at least one embodiment of the present invention.

Referring now to FIGS. 3 and 4, an exemplary system and method for providing one or more advertisements to intercepted caller are described in greater detail in accordance with at least one embodiment of the present invention. The term "advertisement," as used herein, refers to a sound recording that may be played back, or "presented", to the caller to impart information to the caller. Examples of advertisements can include, but are not limited to: commercials, promotionals, referrals, public service announcements (PSAs), weather alerts, news alerts, informationals, instruction recordings, and the like. The advertisements, for example, can include information regarding the telephone service provider carrying the call and/or about features available to the caller, as well as help on how to use the telephone service provider's service(s). To illustrate, an advertisement could include information regarding changes at the company providing the telephone connection and another company that may affect the caller; the advertisement could include information regarding call services available to the caller (e.g., an advertising informing the caller that a call-return feature may be activated by pressing "*69" on the caller's telephone); etc.

The advertisement module 226 may be adapted to provide one or more general advertisements to the caller via the telephone network 208. Alternatively, or additionally, using the call feature(s) provided by the call feature module 224, the advertisement module 226 could be adapted to select one or more targeted advertisements based on the identified call features and provide the targeted advertisements for presentation to the caller via the telephone network 208.

As noted above with reference to FIG. 1, the advertisement(s), whether general or targeted, may be provided for playback to the caller at any number of points during a telephone call. For an unsuccessful telephone call, the advertisements could be provided to an unsuccessful caller prior to an intercept message or after the intercept message (if any). The intercept message also could be incorporated into the advertisement. For example, if the caller were to dial a disconnected number, the advertisement could include a message indicating that the number is disconnected followed by a promotion for one or more telephone service features. In this case, the message could include a targeted solicitation such as: "Congratulations, the number you dialed is disconnected but today is your lucky day! We noticed you do not have call waiting and we want to offer you the opportunity to receive this great service for two free months just by pressing '1' or saying 'yes' now. Call waiting is a valuable service because it lets you . . ."

If the intercepted call is to a telephone that is in use (i.e., a "busy line"), the advertisement(s) could be provided prior to or after the busy signal. Further, the playback of the advertisements could be interleaved with an intercept message, a busy signal, or the ringing of the recipient's telephone. For example, the busy signal and the advertisement could both be provided to the unsuccessful caller at the same time. Alternatively, one or more advertisements could be provided to the caller in between rings of the recipient's telephone or between the tones of the busy signal (i.e., the advertisements may be "interleaved" with the rings or the busy signal). Similarly, one or more advertisements could be provided to the caller prior to the first ring of the recipient's telephone, after a predetermined number of rings, and/or after a predetermined time period from the first ring. Further, in one embodiment, the intercept module 222 or other module of system 220 (FIG. 2) may provide the caller with the option to remain on hold until the line is no longer busy. While on hold, the advertisement module 228 may provide the caller with one or more advertisements.

FIG. 4 illustrates an exemplary method 400 for providing one or more advertisements to an intercepted caller from the system 220 (FIG. 2). The illustrated method 400 initiates at step 402 whereby a telephone call telephone 102 is intercepted by a telephone network (e.g., telephone network 208, FIG. 2) and forwarded to the call feature module 224 of the intercept action system 220. As discussed above, the intercepted call may be intercepted at any point in the telephone network as appropriate. For example, the intercepted call could be intercepted at the central office local to the telephone 102, the remote central office associated with the unavailable number (if any), the local or remote point-of-presence (if a long distance call), and the like. Likewise, the intercepted call could be intercepted at any point during the telephone call, as described above with reference to FIGS. 1A and 1B.

At step 404, the call feature module 224 determines one or more call features associated with the intercepted call.

One or more of the call feature(s) could be determined from the call itself, such as the originating number, the intended destination number, the time and data of the call, and the like. Further, the call feature module 224 could utilize a subscriber database 302 to determine one or more of the call features. To illustrate, the subscriber database 302 could include subscriber data entries 320, each corresponding to a subscriber. Each data entry 320 could include various characteristics associated with the subscriber of the telephone 102, such as the subscriber's name, the subscriber type (e.g., private, business, non-profit, government, etc.), one or more subtypes (such as the type of business, the type of government agency, etc.), a geographical location of the subscriber, a history of phone calls made to/from the subscriber, and the like. The subscriber database 302 also could further include one or more subscriber data entries 320 associated with the previous or current subscriber (if any) associated with the callee.

The call feature module 224 could then select a subset of the call features available from the call itself, data entries 320 associated with the originating subscriber, and/or data entries 320 associated with the destination subscriber. The subset of call features may be selected in any of a variety of ways. The call feature module 224 could be adapted to provide any and all available call features to the advertisement module. Alternatively, the call feature module 224 could be adapted to provide information associated with a predetermined set of call feature categories. Further, the call feature module 224 could provide different subsets of call features for different intercepted calls based on one or more features of the caller/callee. To illustrate, if the intercepted caller is making a telephone call from a telephone 102 described by a data entry 320 as being associated with a business, the subset of call features could include, for example, the type of business and information about a certain number of previous calls made from the telephone 102. If the telephone 102 is described by a data entry 320 as belonging to a private individual, then the subset of call features could include, for example, only the location of the subscriber associated with the telephone 102. Those skilled in the art can develop alternate techniques for selecting the appropriate subset of call features using the guidelines provided herein.

At step 406, in one embodiment, the advertisement module 226 is adapted to identify one or more targeted advertisements (e.g., targeted advertisements 322, 324) for presentation based in part on the call features provided by the call feature module 224. The advertisement module 226 can access an advertisement database 304 having a plurality of advertisements and select one or more advertisements directed to one or more of the identified call feature(s) of the unsuccessful call. The advertisement module 226 then may provide the selected targeted advertisements for presentation to the intercepted caller at the designated point(s) during the telephone call.

To illustrate, assume that the subscriber associated with the telephone 102 is a restaurant business located in Springfield, Ill. Accordingly, the call features provided by the call feature module 224 could include a reference to the subscriber being a business, and more particularly a restaurant, and a reference to the subscriber being located in Springfield, Ill. Using these two call features, the advertisement module 226 could, for example, search the advertisement database 304 to identify one or more advertisements that are targeted to the call features of: "business," "restaurant," "Springfield, Ill.," and "Illinois." In the illustrated example, two advertisements (advertisements 322, 324) of the advertisement database 304 are matches. Advertisement 322, in this example, is an advertisement for a food distributor targeted to restaurants, chefs, and food wholesalers. Since the call feature "restaurant" matches the intended audience of the advertisement 322, the advertisement 322 could be considered a targeted advertisement for the caller. Advertisement 324, in this example, is an advertisement for an office services company having an intended audience of businesses, professionals, and subscribers in Illinois. Accordingly, since the call features "business" and "Illinois" both fit the intended audience of the advertisement 324, the advertisement 324 also may be considered a targeted advertisement for the caller.

As discussed previously, the call feature(s) of a call can include a history of calls made to or from the caller's telephone number or the intended telephone number. Targeted advertisements may be selected using the call history. To illustrate, the subscriber database could include a field of previous calls (the call history) made from the telephone 102. The advertisement module 226 could analyze the call history for the telephone 102 and determine that a significant portion of the calls is made to, for example, a pizza parlor. Accordingly, with this information, the advertisement module 226 may select one or more pizza or food related advertisements to provide to the caller.

In at least one embodiment, the advertisement module 226 may be adapted to maintain a log of advertisements previously provided to the caller/callee in the advertisement database 304. Using this log, the advertisement module 226 can prevent the same advertisement from being provided to the caller/callee during the same or subsequent intercepted telephone calls. Likewise, the advertisement module 226 can use the log to more accurately determine effective targeted advertising based on the previous advertisements provided.

After identifying one or more targeted advertisements from the advertisement database 304, the advertisement module 226 can provide all identified targeted advertisements or up to a predetermined number of the targeted advertisements to the caller (via the telephone network and telephone 102) at one or more points during the telephone call (as identified in FIG. 1). Any of a variety of techniques may be implemented to select a subset of the identified targeted advertisements. For example, those targeted advertisements having a higher relevance (i.e., a higher degree of similarity between the call feature(s) and the intended audience of the advertisement) may be selected before advertisements having a lower relevance. Alternatively, advertisers could be ranked, where the advertisements associated with a higher ranked advertiser are selected prior to the advertisements associated with a lower ranked advertiser.

In addition to providing one or more targeted advertisements, the advertisement module 226 may be adapted to present one or more general advertisements to the caller during the intercepted call. For instance, when one or more general advertisements are provided to the caller, the advertisement module 226 may select one or more of the advertisements from the advertisement database 304 based on a number of factors. In one embodiment, the general advertisements may be selected in a manner similar to a circular queue, whereby each advertisement is selected and presented in turn. In another embodiment, the general advertisements are selected based on a rank, whereby the rank of an advertisement may be determined, for example, based on the amount of consideration provided by the advertiser.

At step 408, the selected advertisements may be presented to the intercepted caller via the telephone network at the one or more designated points during telephone call. In one embodiment, the selected advertisement(s) may be played prior to an intercept message from the intercept module 222 (FIG. 2) to prevent the caller from terminating the call before the advertisement(s) have been presented to the caller. In another embodiment, the advertisements may be of a playback length that allows the advertisement(s) to be heard by the caller before the caller typically would lose interest in continuing the call. The advertisement(s) also may be interleaved with the intercept message or busy tone, played between or interleaved with the telephone rings, and the like.

Figure 5:
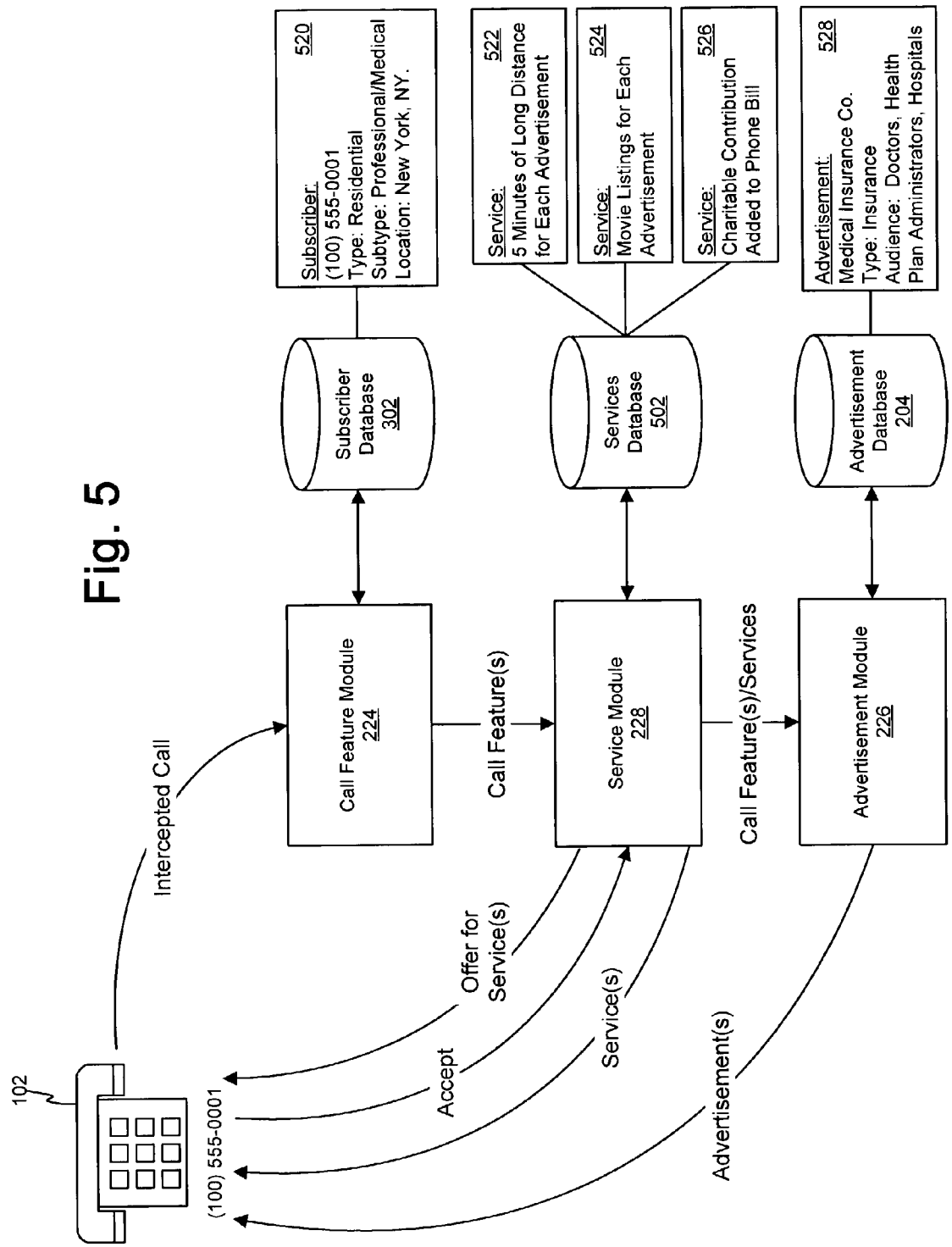
FIG. 5 is a schematic diagram illustrating an exemplary system for providing one or more services to one or more parties to an intercepted telephone call in accordance with at least one embodiment of the present invention.
Figure 6:
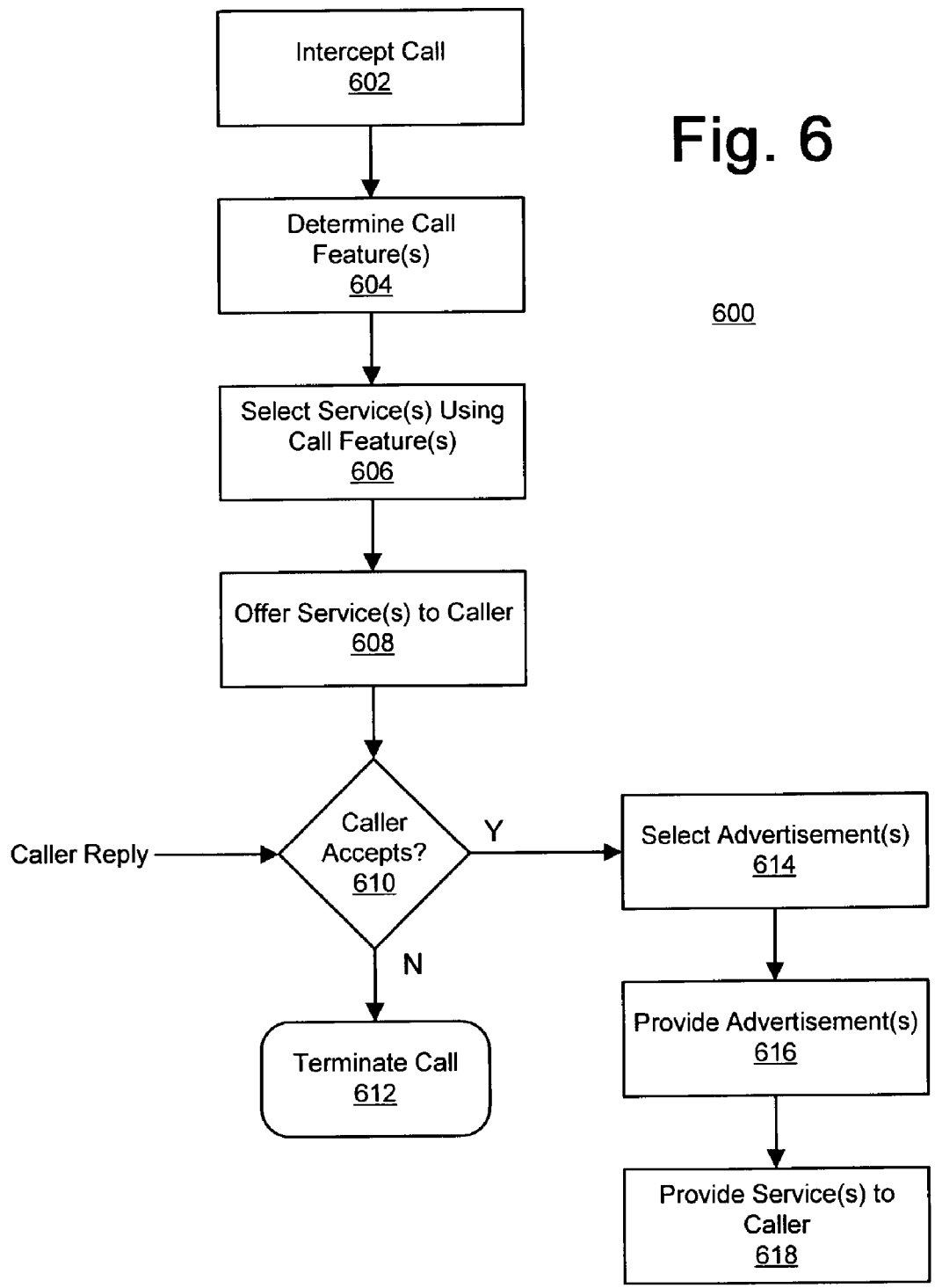
FIG. 6 is a flow diagram illustrating an exemplary method for providing one or more services to one or more parties to an intercepted telephone call in accordance with at least one embodiment of the present invention.

Referring now to FIGS. 5 and 6, an exemplary system and method for providing one or more services to an intercepted caller is illustrated in accordance with at least one embodiment of the present invention. As noted above, the intercept action system 220 (FIG. 2) may be adapted to provide one or more services (one embodiment of an intercept action) to the caller. The term "service", as used herein, refers to the performance of one or more processes or the provision of one or more rewards by the intercept action system 220 or an affiliated system for the benefit of the caller. Examples of services that may be provided by the intercept action system 220 or an affiliated system can include, but are not limited to: long-distance telephone time, movie listings, directory assistance, restaurant reservations, weather reports, news reports, informationals, entrance into a sweepstakes contest, and the like.

The services may be provided to induce the caller to listen to the one or more advertisements as they are presented or in combination with one or more adds. Alternatively, the one or more services may be provides as a gratuity as well as for other reasons as appropriate. When providing one or more services to induce the caller to listen to one or more advertisements, the service module 228 may be adapted to offer one or more services to the caller and then provide the one or more services to the caller upon acceptance of the offer from the caller.

As with advertisements provided by the intercept action system 220, the one or more services provided by the service module 228 can include general services and/or targeted services, where the targeted services may be selected based in part on the call feature(s) determined by the call feature module 224. For example, during the week prior to Mother's Day, the advertising module 226 could play an advertisement to intercepted callers, reminding the callers to "show your mother that you love her by sending her flowers." The service module 228 then could offer to transfer the intercepted calls to a telephone order line of a florist. In another example, a caller could attempt to place an unsuccessful call to a movie theatre, where the number for the movie theater has changed. The unsuccessful call is intercepted and handled by the intercept action system 220. The call feature module 224 could determine that the telephone number dialed by the caller was previously associated with a movie theater. Accordingly, the service module 228, using this information, could provide movie listings for the movie theatre to the caller to induce the intercepted caller to listen to one or more advertisements. Targeted services may be selected for provision based on any of a number of call features, including calling number, number called, call history, previous or current subscriber to the number called, time of call, date or day of call, and the like.

FIG. 6 illustrates an exemplary method for providing one or more services to induce an intercepted caller to listen to one or more advertisements. Those skilled in the art, however, can adapt the exemplary method to provide services gratuitously or for other reasons, using the guidelines provided herein. As with method 400, the exemplary method 600 initiates with step 602 whereby a telephone call from telephone 102 is intercepted at some point and provided to the intercept action system 220. At step 604, the call feature module 224 determines one or more call features associated with the intercepted call, using, for example, the subscriber database 302 as discussed above, and provides information associated with a subset of the call features to the service module 228.

At step 606, the service module 228 identifies one or more services available to the intercepted caller from, for example, a services database 502 having a plurality of available services. The services to be offered, in one embodiment, are selected based in part on the call features identified by the call feature module in step 604. For example, the data entry 520 of the subscriber database 302 associated with the unsuccessful subscriber could identify the subscriber as a residential subscriber who is a medical professional located in New York. Accordingly, the service module 228 could select, for example, to offer the unsuccessful caller five minutes of long-distance telephone service for each advertisement presented (service entry 522) based on the "residential" feature of the subscriber. Likewise, the service module 228 could a select New York City movie listing service (service entry 524) based in part on the subscriber being identified as being located in New York City. Further, the service module 228 could, for example, elect the service of soliciting for a medical charity (service entry 526) based in part on the call feature identifying the subscriber as, for example, a medical professional.

The one or more services also could be selected based in part on the intended recipient of the telephone call. To illustrate, if the caller attempted to call a movie theater that was no longer in business, the call feature module 224 could access the database 302 to determine that the previous subscriber for the unavailable number was the movie theater and provide this information to the service module 228. Based on this information, the service module 228 could, for example, select a movie listing service for the caller. This service would then provide movie listings over the phone for a nearby movie theatre. Likewise, information about the call itself could be used to select a service. For example, if the caller made an unsuccessful call on a certain holiday, one or more services associated with that holiday could be selected, such as a recording of government agencies closed on that holiday.

As with the selection of targeted advertisements, the subset of available services to be offered to the caller may be selected in any of a variety of ways, as appropriate. For example, the services could be weighted based on the degree to which a particular service matches the identified call features, the services could be selected by a ranking of the providers of the services, and the like. Further, like the advertisement module 226, the service module 228 may be adapted to maintain a log of services previously provided to prevent the same services from being offered within a certain time period/number of calls, or to more accurately determine effective service offerings.

At step 608, the service module 228, in one embodiment, offers the one or more of the selected services to the intercepted caller in exchange for the caller listening to one or more advertisements. The offer can include, for example, a playback of an audio recording informing the caller of the availability of one or more services. The offer also may inform the caller of the number and/or type of advertisements to be presented to the caller in exchange for one or more of the offered services.

At step 610, the service module 228 receives the response to the offer from the caller. The response could include one or more spoken words that are interpreted by a voice recognition module (not shown) of the service module 228. For example, the offer for the services provided to the caller at step 608 could include a numbered listing of the available services and instructions directing the caller to speak the number of the desired service into the receiver of the telephone 102, or if no service is desired, directing the caller to terminate the call, or speak, for example, the word "none" or "no." The voice processing module of the service module 228, upon receipt of the spoken response, then converts the caller's spoken response into a signal indicating the selected service or services. In another example, the offer provided to the caller at step 608 could include the numbered listing and directions for the caller to select one or more services using the keypad of the telephone 102. In this case, the service module 228 could include a DTMF interface (not shown) adapted to convert the DTMF signal from the telephone 102 resulting from the selection of a key of the keypad by the caller into a signal used by the service module 228 to identify the selected service(s).

Should the intercepted caller decline to receive a service in exchange for advertisement, the method 600 terminates at step 612 when the unsuccessful call is terminated. Otherwise, should the caller elect to receive one or more services, the method 600 continues to step 614, wherein one or more advertisements are selected by the advertisement module 226 from, for example, the advertisement database 304 for presentation to the caller. As discussed above with reference to FIGS. 3 and 4, the advertisement module 226 may be adapted to select one or more targeted advertisements based in part on the call feature(s) associated with the unsuccessful call, to select one or more general advertisements, or a combination thereof. In the illustrated example, a targeted advertisement for a medical insurance company (advertisement 528) is selected based in part on the call feature identifying the subscriber as a medical professional (subscriber data entry 520).

It will be appreciated that a caller may be tempted to terminate the call prematurely if the service(s) are provided prior to the presentation of the advertisement(s). Accordingly, in one embodiment, at least one advertisement preferably is presented at step 616 prior to the provision of at least one service at step 618. All of the selected advertisements may be presented prior to the provision of the first service or the presentation advertisements may be interleaved with the provision of services. For example, if the caller in exchange for the presentation of six advertisements elects a total of three services, the advertisement module 226 could present the first two advertisements (step 616) and then the service module 228 could provide the first service (step 618). The advertisement module 226 could then present the next two advertisements (step 616) followed by the next service from the service module 228 (step 618), and so on.

The number and manner in which services are offered and provided can vary without departing from the spirit or the scope of the present invention. For example, the service module 228 may be adapted to direct the caller to select only a single service (step 608). After the caller selects a service (step 610), the advertisement module 226 can provide the advertising associated with the selected service (step 616) and then the selected service can be provided by the service module 228 (step 618). The service module 228 then may direct the caller to select another service (step 608), present the advertisement (step 616) and then selected service (step 618), and so on, until a predetermined maximum number of services have been selected by the caller. Alternatively, the service module 228 could be adapted to offer the caller services in groups (step 608), wherein the advertising associated with the group of services is presented (step 616) and each of the group of services is provided to the caller (step 618) before the caller is able to select the next group of services to be provided. The service module 228 also could be adapted to allow only a single service to be performed before terminating the call. As with advertisements, the services may be provided at any point prior to the termination of the call, such as before or after an intercept message or busy signal (if any), interleaved with the busy signal or between telephone rings, and the like.

Figure 7:
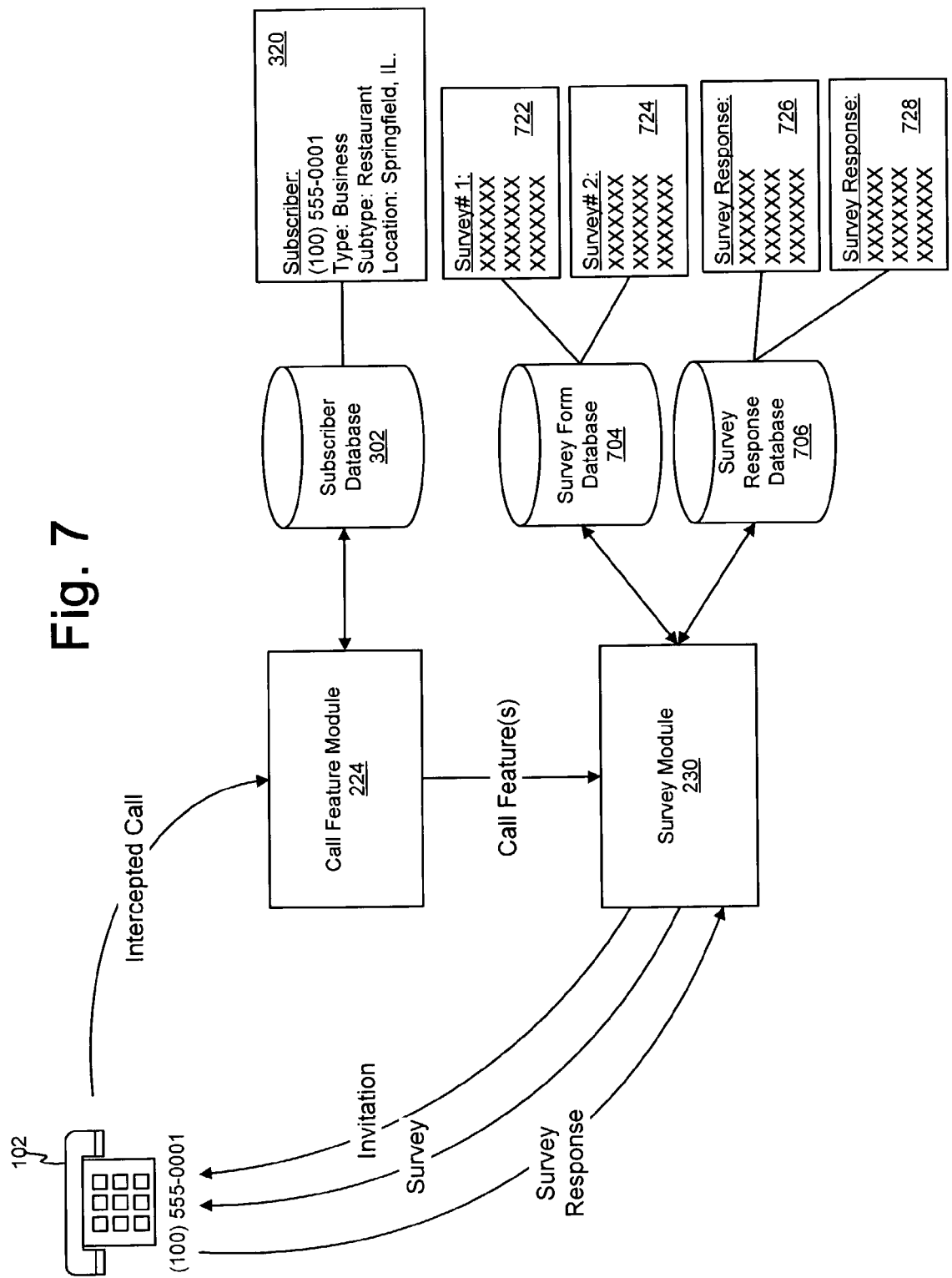
FIG. 7 is a schematic diagram illustrating an exemplary system for providing one or more surveys to one or more parties to an intercepted telephone call in accordance with at least one embodiment of the present invention.
Figure 8:
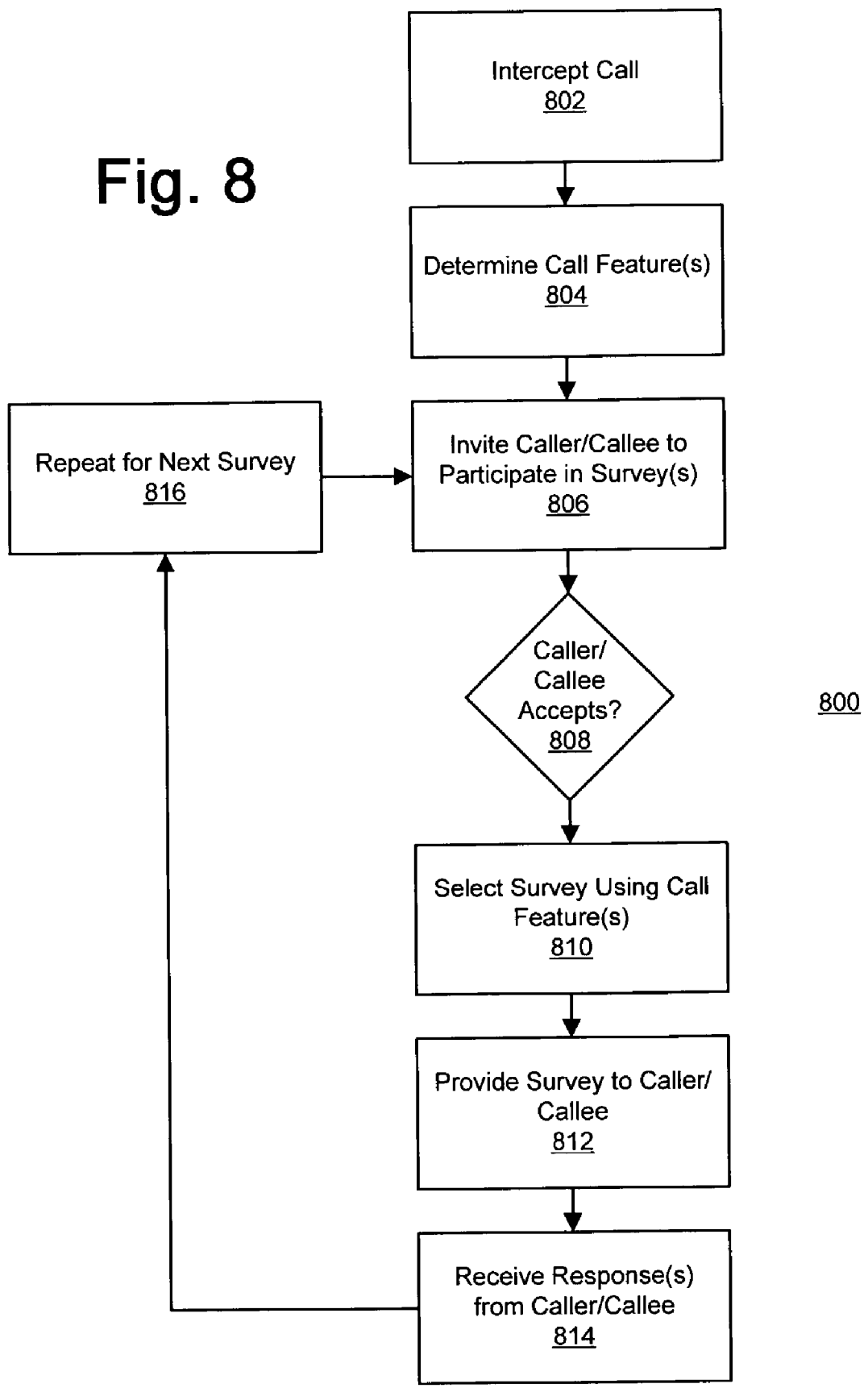
FIG. 8 is a flow diagram illustrating an exemplary method for providing one or more surveys to one or more parties to an intercepted telephone call in accordance with at least one embodiment of the present invention.

Referring now to FIGS. 7 and 8, an exemplary method and system for providing one or more surveys to an intercepted caller are illustrated in accordance with at least one embodiment of the present invention. The term "survey," as used herein, refers to an automated mechanism for obtaining information from the intercepted caller. A survey may include, for example, an opinion survey, a poll, a vote, a questionnaire, and the like. The survey preferably is performed by playback of a prerecorded or digitally synthesized voice survey, wherein the caller provides feedback in response to the oral questions or statements. In one embodiment, the feedback from the caller may be in the form of a recording of the caller's vocalized response. Voice recognition software or a transcription specialist then can transcribe the voice recording. The caller also can provide feedback via the keypad of the telephone 102, whereby a DTMF interface of the survey module 230 can convert the DTMF tone produced by the selected key of the keypad into a digital value representing the caller's selection. To illustrate, the survey could direct the caller to "press the '1' key if you are satisfied with your telephone carrier or press the '2' key if you are unsatisfied." The caller would then select the applicable key, which would generate the corresponding DTMF tone that then would be translated into a digital value by the DTMP interface and tallied in a database.

FIG. 8 illustrates an exemplary method for providing one or more surveys to an intercepted caller. The method 800 initiates at step 802 whereby a telephone call from telephone 102 is intercepted at some point and provided to the intercept action system 220. At step 804, the call feature module 224 determines one or more call features associated with the intercepted call, using, for example, the subscriber database 302 as discussed above, and provides information associated with a subset of the call features to the survey module 230.

Step 806 includes inviting the caller to participate in the survey. As with the provision of advertisements, the survey module 230 could offer one or more services (provided via service module 228) in exchange for the caller's participation in the survey. If the caller accepts (step 806), the method 800 continues to step 810. Otherwise, the method 800 terminates at step 818, wherein the call is terminated (if an intercepted unsuccessful call) or the caller continues in the call (if an intercepted successful call).

At step 810, the survey module 230 selects a survey from a survey form database 704, wherein the survey form database 704 includes one or more survey forms 722–724. The survey forms 722–724 can include a prerecorded voicing of the associated survey, a survey text file to be rendered into a synthesized voice, and the like. In at least one embodiment, the survey selected by the survey module 230 is based in part on the call features determined by the call feature module 224. For example, if the survey includes a political poll, the relevant call feature could include the geographical location of the intercepted caller. The survey module 230 could select a political poll from the survey database 704 for the political district in which the caller is located.

At steps 812 and 814, the questions/statements of the survey are played back to the caller and the caller's responses are recorded, as discussed above. At step 816, steps 806–814 are repeated for the desired number of surveys. After the caller participates in the last survey to be provided, the method 800 terminates wherein the call is terminated (if an intercepted unsuccessful call) or the caller continues in the call (if an intercepted successful call).

The use of automated surveys may be particularly useful for telephone service providers. In certain instances, the survey module 230 may be adapted to provide a questionnaire to the intercepted caller that asks the caller to identify one or more other telephone users who may be interested in changing long-distance carriers. To provide the caller incentive to participate, the survey could offer, for example, a certain number of months of free long-distance to the caller. The caller would then speak the name and/or contact information of one or more other telephone users while the survey module 230 records the response. The recorded information then could be transcribed and used by the telephone service provider to market long-distance services to the identified telephone users.

Figure 9:
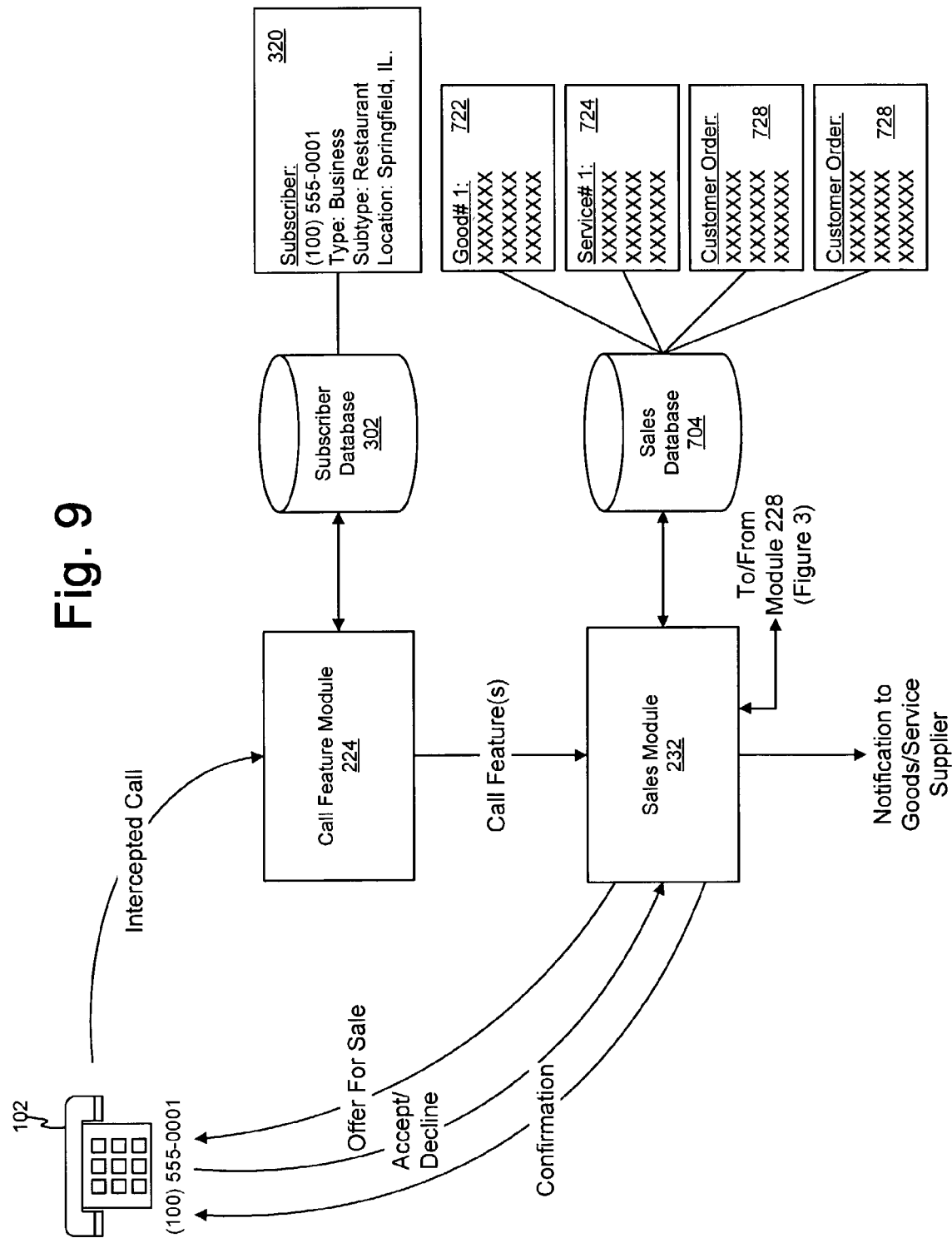
FIG. 9 is a schematic diagram illustrating an exemplary system for providing one or more offers for goods/services to one or more parties to an intercepted telephone call in accordance with at least one embodiment of the present invention.
Figure 10:
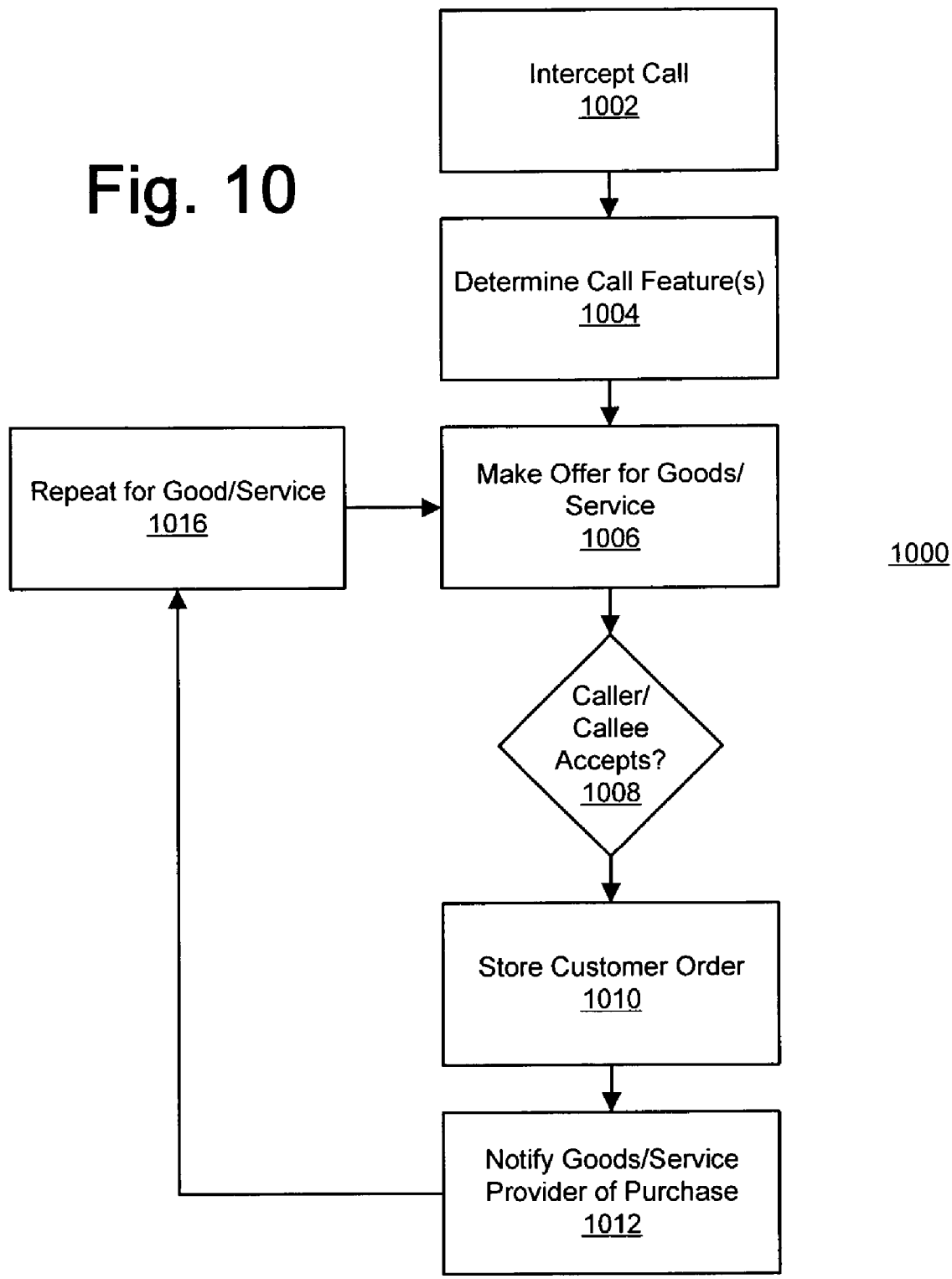
FIG. 10 is a flow diagram illustrating an exemplary method for providing one or more offers for goods/services to one or more parties to an intercepted telephone call in accordance with at least one embodiment of the present invention.

Referring now to FIGS. 9 and 10, an exemplary method and system for facilitating a sales transaction with an intercepted caller for goods and services are illustrated in accordance with at least one embodiment of the present invention. The term "sales transaction," as used herein, refers to an automated process whereby the sales module 232 plays a pre-recorded or voice synthesized offer for one or more goods or services to a caller and receives the caller's response to the offer. If the caller accepts, the sales module 232, in one embodiment, may be adapted to complete the order and then initiate the provision of the purchased good/service to the caller. In another embodiment, the sales module 232, upon acceptance of an offer, may be adapted to transfer the caller to the telephone line of a third party that will then complete the caller's purchase. If the caller declines, however, the sales module 232 may be adapted to provide an offer for another good/service or the sales module 232 can terminate the call or allow the call to continue.

A variety of manifestations of acceptance by the caller may be used, such as by directing the caller to press a button or by speaking a specified word corresponding to an acceptance of the offer. Upon receipt of the acceptance manifestation, the sales module 232 then can initiates the shipment of the good and/or the provision of the service, as well as initiating the billing for the product/service. To illustrate, after intercepting a caller at a certain point during a telephone call (see FIG. 1), the sales module 232 could offer the intercepted caller a pair of tickets to a sporting event for a specified price. The caller could manifest acceptance by, for example, pressing the '1' key on the keypad of the telephone 102. Upon receipt of the acceptance, the sales module 232 could obtain credit card information (entered via the keypad, for example), and store this information as purchase order entry in a sales database 704. Another system then could access the sales database 704, obtain the purchase order, and from the purchase order, bill the caller's credit card and initiate the shipment of the tickets to the caller's address. When the caller is offered and accepts the purchase of a service, in one embodiment, the sales module 232 signals the service module 228 (FIG. 3) to direct the service module 228 to provide the purchased service. Alternatively, the sales module 232 contacts a third party service provider to provide the purchased service.

FIG. 10 illustrates an exemplary method 1000 for providing one or more surveys to an intercepted caller. The method 1000 initiates at step 1002 whereby a telephone call from telephone 102 is intercepted at some point and provided to the intercept action system 220. At step 1004, the call feature module 224 determines one or more call features associated with the intercepted call, using, for example, the subscriber database 302 as discussed above, and provides information associated with a subset of the call features to the sales module 232.

At step 1006, the sales module 232 selects a goods offer (goods offer 722) or a service offer (service offer 724) from the sales database 704. The offer selected preferably is based in part on the call feature(s) determined at step 1004. For example, if one of the call feature(s) represented that the intercepted caller did not have caller ID service, the sales module 232 could select an offer for a caller ID box from the sales database 704. Step 1006 further includes providing an offer for the goods/service to the caller. As noted previously, the offer can include, for example, a prerecorded voice playback or a synthesized voice reading of, for example, a text file. If the caller accepts the offer (step 1008), such as by pressing a certain key of telephone 102 or voicing the word "yes", the sales module 232 proceeds to step 1010. Other wise, method 1000 terminates with the call being terminated or allowed to continue to the callee.

At step 1010, the sales module 232, in one embodiment, obtains billing and/or shipping information from the caller and submits a purchase order to the sales database 704. In another embodiment, the sales module 232 directs the caller to the telephone line of a third party which finishes the purchase of the good/service.

At step 1012, the sales module 232 provides notice to the provider of the goods/service purchased by the caller. If a purchased service is available from the service module 228 (FIG. 2), the sales module 232 can direct the service module 228 to provide the service to the caller. If the goods/service provider is a third party, the sales module 232 can transmit a representation of the purchase order to the third party for fulfillment. Alternatively, the goods/service provider may be permitted to directly access the sales database 704 to obtain purchase orders generated from intercepted callers.

In the event that more than one offer for goods or services is to be provided to the caller, steps 1006–1012 are repeated at step 1016 for each goods/service offered. Otherwise, method 1000 terminates and the sales module 232 allows the call to continue or terminate, as appropriate.

Figure 11:
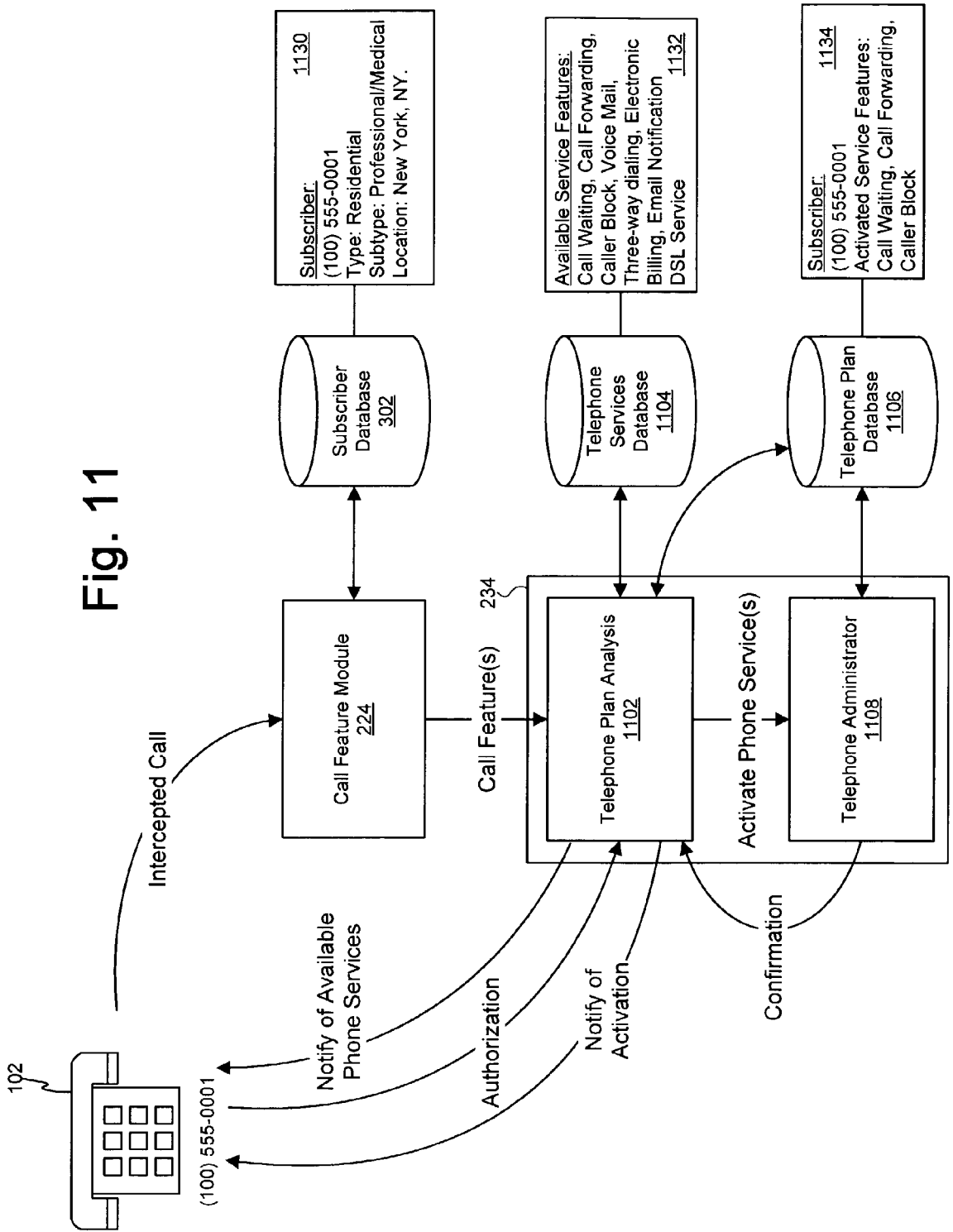
FIG. 11 is a schematic diagram illustrating an exemplary system for modifying a telephone service plan of one or more parties to an intercepted telephone call in accordance with at least one embodiment of the present invention.
Figure 12:
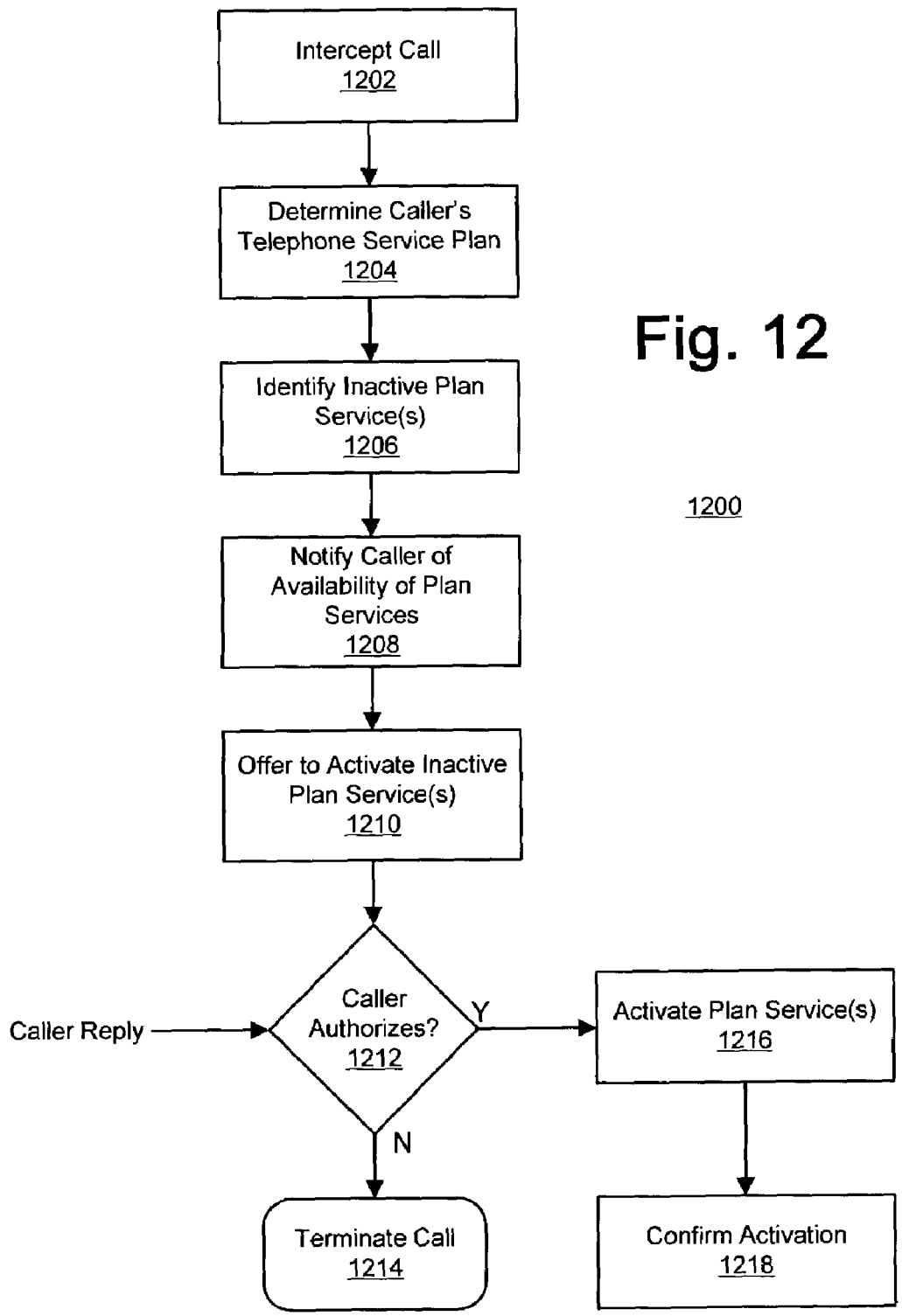
FIG. 12 is a flow diagram illustrating an exemplary method for modifying a telephone service plan of one or more parties to an intercepted telephone call in accordance with at least one embodiment of the present invention.

Referring now to FIGS. 11 and 12, an exemplary method and system for modifying a telephone service plan of a subscriber during an attempted call to an unavailable number or after the termination of a call is illustrated in accordance with at least one embodiment of the present invention. The term "service feature", as used herein, refers to a telephone service plan option or feature provided by a telephone service provider (i.e., a telephone carrier) as part of a subscriber's telephone service plan. Service features can include, for example, call waiting, call forwarding, call blocking, caller identification (ID), caller ID-call waiting, call return, call block, auto redial, voice mail, three way calling, digital subscriber line (DSL) service, busy number redial, bundled service features, and the like. Furthermore, service features can include related services provided by telephone service providers and their affiliates, such as digital subscriber line (DSL) service.

Telephone service providers often find it difficult to notify subscribers of new service features, as well as informing subscribers of currently available service features that are not activated in the telephone service plan of the subscriber. Telephone service providers may resort to advertising available service features while providing customer service. However, this typically is an ineffective advertising method as relatively few customers call customer support, and of those few that do use customer support, many of them are calling to resolve problems and, therefore, are not in a state of mind conducive to sales pitches. Accordingly, in at least one embodiment, the intercept action system 220 may be adapted to enable callers to modify their telephone service plans after attempting to call an unavailable number. In the exemplary embodiment illustrated in FIG. 11, the system 220 includes the service plan module 234 having a telephone plan analysis module 1102 and a telephone administration module 1108 having access to one or more databases, such as telephone services database 1104 and telephone plan database 110. The method 1200 of FIG. 12 illustrates an exemplary method for modifying a telephone service plan using the system 220 of FIG. 11.

The exemplary method 1200 initiates at step 1202 wherein a telephone call from telephone 102 is intercepted by a telephone network (e.g., telephone network 208, FIG. 2) at some point during the telephone call (FIG. 1) and the intercepted call is provided to the intercept module 222 (FIG. 2), which forwards the call to the call feature module 224. At step 1204, the call feature module 224 identifies one or more relevant call features associated with the unsuccessful call using, for example, the associated subscriber data entry 1130 of the subscriber database 302. The relevant call feature(s) can include, but are not limited to, the originating telephone number, the subscriber's name, the subscriber's address, the account number associated with the subscriber, and the like. The call feature(s) also may include historical data regarding the caller's line or the callee's line, such as telephone usage (i.e., minutes per month, areas called in a given month, specific numbers recently or repeatedly called), the phone numbers that have recently called the callee's telephone number, the number of calls missed over a given time period, and the like.

At step 1206, the telephone plan analysis module 1102 obtains the telephone service plan 1134 associated with the subscriber from a telephone database 1106 using one or more of the call feature(s) provided from the call feature module 224, such as the subscriber name or the account number. Using information from the call feature(s) and/or the telephone service plan 1134, the telephone plan analysis module 1102, in one embodiment, obtains a listing of the service features available to the subscriber (available listing 1132). For example, using a location of the subscriber (one example of a call feature), the telephone plan analysis module 1102 could obtain a listing of the service features available to subscribers in the identified location.

At step 1206, the telephone plan analysis module 1102 compares a list of currently activated service features of the telephone service plan 1134 with the available service features of the available service features listing 1132 to identify those available service features that are not activated in the telephone service plan 1134 of the subscriber (herein referred to as the "inactive" service features).

Additionally, the telephone plan analysis module 1102 may "upsell" one or more service features using historical information or usage information associated with the intercepted party's telephone line (examples of call features). To illustrate, after intercepting a caller's telephone call at some point during the call, the call feature module 224 could determine from the subscriber database 302 that the caller missed twenty phone calls in the previous thirty days because the caller did not have a call waiting service feature activated on the caller's line. Accordingly, the telephone plan analysis module 1102 then may select the "call waiting" service feature for offer to the caller so that the caller may avoid missed calls after activating this feature.

At step 1208, the telephone plan analysis module 1102, in one embodiment, notifies the unsuccessful caller of the availability of one or more of the identified inactive service features. The notification can include, for example, advertisements provided by the advertisement module 226, the advertisements describing the features and costs of the service features available for activation. At step 1210, the telephone plan analysis module 1102 may then provide an offer to activate one or more of the inactive service features, such as by playing an audio recording that describes one or more of the service features available for activation. To illustrate using the missed calls example above, the telephone plan analysis could used the missed call history to upsell the call waiting service feature by informing the caller that "You have missed twenty phone calls in the last month because you were on the phone at the time. With call waiting, you will never miss a call because you were talking to someone else. If you would like to activate call waiting, please press '1' and you will enjoy the first month of call waiting free!"

At step 1212, the telephone plan analysis module 1102 waits for a response from the caller, where the response can include, for example, a voice response or a selection of one or more keys of the telephone keypad indicating an acceptance or decline of the offer to activate the specified service feature(s). The telephone plan analysis module 1102 could also be adapted to present a list of service features available for activation, wherein the caller can accept one or more of the offered service features by pressing a key or speaking a word or phrase that manifests acceptance of the offer for the desired service feature(s).

If the intercepted caller elects to forgo activating one or more of the new service features, the method terminates at step 1214 by terminating the call. Otherwise, if the caller elects to activate one or more of the offered inactive service features, the method continues at step 1216, where the telephone plan analysis module 102 directs the telephone administration module 1108 to activate the indicated service features for the telephone service plan 1134 of the subscriber.

It will be appreciated that the caller using the telephone 102 may not be the subscriber associated with the telephone 102 and, therefore, may not be authorized to make any modifications to the telephone service plan of the subscriber. Accordingly, the telephone plan analysis module 1102 may be further adapted to attempt to determine the authority or identity of the caller. For example, prior to notifying the caller of the currently inactive service features available for activation (step 1208), the telephone plan analysis module 1102 could be adapted to direct the caller to provide personal information via voice or the keypad, such as by entering a social security number, an address, a telephone number, a passcode or password, an account number, and the like. Based in part on this information, the telephone plan analysis module 1102 can determine whether or not the caller is authorized to modify the telephone service plan associated with the subscriber of the telephone 102. This identity verification may be performed earlier or later in the process represented by the steps of method 1200 as appropriate.

Alternatively, rather than confirming the identity of the caller, the telephone plan analysis module 1102 could assume that the caller is in fact authorized to modify the service plan associated with the subscriber of the telephone number used by the caller. In this case, the telephone service provider could, for example, indicate in the subscriber's bill that the new feature has been activated. The subscriber could then receive a grace period of, for example, one month to deactivate the new service before the telephone service subscriber begins to charge for the new service, thereby allowing the subscriber to cancel any unauthorized modifications to the service plan.

After the telephone administration module 1108 confirms the activation of the selected service features, the telephone plan analysis module 1102 may be adapted to provide a confirmation of the activation of the selected service features to the caller at step 1218. The confirmation can further include information regarding the new service features, such as the typical amount of time before the recently-activated service feature is ready for use by the subscriber.

The exemplary method 1200 of FIG. 12 may be more thoroughly understood by considering the following example. In this example, a caller (who is also the authorized subscriber) attempts to call an unavailable telephone number. The unsuccessful call is intercepted (step 1202) by the telephone carrier and forwarded to intercept module 222 (not shown) of the system 220. The call feature module 224 determines the originating phone number (100) 555-0001 (one example of a call feature) and provides this originating phone number to the telephone plan analysis module 1102. Using the originating phone number, the telephone plan analysis module 1102 locates the corresponding telephone service plan 1134 in the telephone plan database 1106 (step 1204). In this example, the telephone service plan 1134 has the "call waiting", "call forwarding" and "caller block" service features activated.

The telephone plan analysis module 1102 then compares the activated telephone services of the telephone service plan 1134 with a list of available service features (available listing 1132) including the "call waiting", "call forwarding", "caller block", "voice mail", "three-way dialing", "electronic billing", "email notification", and "digital subscriber line (DSL)" service features. By comparing these two lists, the telephone plan analysis module 1102 determines that the "voice mail", "three-way dialing", "electronic billing", "email notification", and "digital subscriber line (DSL)" service features currently are inactive for the subscriber (step 1206). In this example, the telephone plan analysis module 1102 selects the "electronic billing" service feature to offer to the intercepted caller.

Accordingly, the telephone plan analysis module 1102 provides a voice recording to the caller/subscriber informing the caller/subscriber that the "electronic billing" service feature is available for activation, as well as a short advertisement describing the "electronic billing" service feature (step 1208). At step 1210, the telephone plan analysis module 1102 provides a voice recording of a list of directions for the caller/subscriber to follow to activate the offered service feature (step 1210). Assume in this example that the directions indicate that the caller should press the '1' key of the telephone keypad of telephone 102 to authorize the activation of the "electronic billing" service feature and the '2' key to decline activation. Further assume in this example that the caller presses the '1' key to accept the offered activation of the "electronic billing" service feature (step 1212).

Upon identification of the keys pressed by the caller, the telephone plan analysis module 1102 directs the telephone administration module 1108 to activate the "electronic billing" service feature (step 1212) in the telephone service plan 1134 of the caller (step 1216). The telephone administration module 1108 updates the telephone service plan 1134 to reflect the newly activated service feature and provides a notification to the telephone plan analysis module 1102 indicating the successful activation of the service features. The telephone plan analysis module 1102 then can provide a voice recording to the caller/user indicating that the modifications were successfully made and giving notice of the typical time period before the new services may be used by the caller/subscriber.

In addition to modifying the telephone service plan of a subscriber, the system 220, in one embodiment, may be utilized to enable callers to change telephone service providers for local and/or long-distance service. To illustrate, when a long-distance call is made from telephone 102, the telephone call may be intercepted by the local telephone carrier (either at the near or far end of the long-distance call). The local telephone carrier, using the system 220, could identify the long-distance carrier to which the telephone 102 is subscribed. To illustrate, the call feature module 224 could be adapted to cross-match the caller's phone number (the "ANI") with a list of subscribers serviced by various long-distance telephone carriers. Based on relationships the local telephone carrier has with one or more long-distance telephone carriers, the intercepting local telephone carrier can offer to switch the caller from one long-distance carrier to another long-distance carrier. Should the caller accept, the system 220 then can initiate the transfer of service, such as by sending a message to a sales representative for the intercepting long-distance carrier, by starting an automated process of assigning the selected long-distance carrier as the long-distance carrier for the subscriber, and the like.

As described above, FIGS. 1–12 illustrate various exemplary systems and methods for providing advertisements and/or services to callers attempting to make a call to an unavailable number. The hardware portions of the system 220 (FIGS. 3, 5, 7, 9, 11) may be in the form of a "processing device," such as a microprocessor, microcontroller, application specific integrated circuit, or a programmable logic controller, for example. Similarly, the system 220, in part or in whole, may be implemented as various forms of hardware, such as discrete logic, a programmable logic device, an application specific integrated circuit, or a combination thereof.

Further, various components of the system 220 and/or steps of the exemplary methods 400, 600, 800, 1000 and 1200 (FIGS. 4, 6, 8, 10 and 12, respectively) may be implemented as a set of executable instructions (i.e., software) executed by the a processing component of the system 220. The instructions may be either permanently or temporarily stored in memory of the system 220. The set of instructions may include various instructions that perform a particular task or tasks, such as those tasks described above with reference to the methods 400, 600, 800, 1000, 1200. Such a set of instructions for performing a particular task may be characterized as a program, software program, or simply software. The software may be in the form of, for example, system software or application software. The software might also be in the form of a collection of separate programs, a program module within a larger program, or a portion of a program module. The software used might also include modular programming in the form of object-oriented programming.

Further, it is appreciated that the instructions or set of instructions used in the implementation and operation of the invention may be in a suitable form such that a processor or other processing component may read the instructions. For example, the instructions that form a program may be in the form of a suitable programming language, which is converted to machine language or object code to allow the processing component to perform the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Other embodiments, uses, and advantages of the invention will be apparent to those skilled in the art from consideration of the specification and practice of the invention disclosed herein. The figures and the specification should be considered exemplary only, and the scope of the invention is accordingly intended to be limited only by the following claims and equivalents thereof.

What is claimed is:

1. A method comprising the steps of:
   intercepting an unsuccessful telephone call attempted by a caller on an automatic advertising/service intercept action system before initiating any action by a telephony network back to the caller, wherein the automatic advertising/service intercept action system does not include subscription rights for a number dialed by the caller resulting in the unsuccessful telephone call;
   automatically routing the intercepted telephone call to one of a plurality of different modules on the automatic advertising/service intercept action system; and
   providing at least one sales offer for at least one good or service to the caller during the interception of the unsuccessful telephone call via one or more of the plurality of different modules on the automatic advertising/service intercept action system, wherein the at least one sales offer includes at least one sales offer specifically targeted to the caller.

2. The method as in claim 1, wherein a point that the at least one sales offer is provided includes one of a group consisting of: during an attempt at establishing a circuit between the caller and an intended callee; prior to a busy tone; during a busy tone; after a busy tone; prior to an intercept message; during an intercept message; and after an intercept message.

3. The method as in claim 1, further comprising the step of: providing an intercept message to the caller, the intercept message representing a status of the unsuccessful telephone call.

4. The method as in claim 1, further comprising the steps of:
   determining at least one call feature associated with the unsuccessful telephone call; and
   selecting at least targeted one sales offer based at least in part on the at least one call feature.

5. The method as in claim 4, wherein the at least one call feature associated with the unsuccessful telephone call includes one of a group consisting of: information associated with a caller of the unsuccessful telephone call; and information associated with an intended callee of the unsuccessful telephone call.

6. The method as in claim 4, wherein the at least one call feature includes one of a group consisting of: previous usage of a telephone line of the caller; and a call history of a telephone line of the caller.

7. The method as in claim 1, wherein the at least one service includes one of a group consisting of: long-distance telephone time; a movie listing; a restaurant reservation; a weather report; a news report; and transferring the call to another telephone number.

8. The method as in claim 1, further comprising the step of:
   providing for a delivery of the at least one offered good or service to the caller when the party accepts the sales offer.

9. The method as in claim 8, further comprising the step of receiving a voice response of the caller indicating an acceptance of the sales offer.

10. The method as in claim 8, further comprising the step of:
    receiving a key tone from a telephone of the caller, the key tone indicating an acceptance of the sales offer.

11. The method as in claim 8, wherein the step of providing for the delivery of the at least one offered good or service includes placing an order with a third party for delivery of the at least one offered good or service.

12. The method as in claim 1, wherein the at least one sales offer includes a targeted sales offer to activate at least one inactive service feature of a telephone service plan of the caller.

13. The method as in claim 12, further comprising the step of:
    identifying at least one inactive service feature of the telephone service plan.

14. The method as in claim 13, wherein the at least one inactive service feature is identified based in part on one of a group consisting of: a call history of a telephone line associated with the caller; and prior usage of a telephone line associated with the caller.

15. The method as in claim 12, further comprising the step of:
    activating at least one inactive service feature in the telephone service plan when the caller accepts the targeted sales offer to activate at least one inactive service feature.

16. The method as in claim 15, further comprising the step of:
    receiving a voice response of the caller indicating an acceptance of the offer to activate at least one inactive service feature.

17. The method as in claim 15, further including the step of:
    receiving a key tone from a telephone of the party, the key tone indicating an acceptance of the offer by the party.

18. The method as in claim 12, wherein the at least one service feature includes one of a group consisting of: call waiting; call forwarding; call blocking; caller identification; caller ID-call waiting; call return; call block; auto redial; voice mail; three way calling; digital subscriber line (DSL) service; and busy number redial.

19. In a telephone network, a system comprising:
an intercept module on an automatic advertising/service intercept action system with a plurality of different modules being adapted to intercept an unsuccessful telephone call attempted by a caller before initiating any action by a telephony network back to the caller, wherein the automatic advertising/service intercept action system does not include subscription rights for a number dialed by the caller resulting in the unsuccessful telephone call; and
means for providing at least one sales offer for at least one good or service to the caller during the interception of the unsuccessful telephone call, wherein the at least one sales offer includes at least one sales offer specifically targeted to the caller.

20. The system as in claim 19, wherein a point that the at least one sales offer is provided includes one of a group consisting of: during an attempt at establishing a circuit between the caller and an intended callee; prior to a busy tone; during a busy tone; after a busy tone; prior to an intercept message; during an intercept message; and after an intercept message.

21. The system as in claim 19, further comprising a call feature module operably connected to the intercept module and means for providing at least one targeted sales offer and being adapted to determine at least one call feature associated with the unsuccessful telephone call.

22. The system as in claim 21, further comprising means for selecting at least targeted one sales offer based at least in part on the at least one call feature.

23. The system as in claim 19, further comprising an advertisement module operably connected to the intercept module and being adapted to provide at least one targeted advertisement to the caller during the interception of the unsuccessful telephone call.

24. The system as in claim 23, wherein the at least one targeted advertisement includes one of a group consisting of: a commercial, a promotional, a referral, a public service announcement, a weather alert, an informational and a news alert.

25. The system as in claim 19, wherein the means for providing at least one targeted sales offer includes a sales module operably connected to the intercept module and being adapted to provide the sales offer to the caller during the interception of the unsuccessful telephone call.

26. The system as in claim 19, wherein the at least one service includes one of a group consisting of: long-distance telephone time; a movie listing; a restaurant reservation; a weather report; a news report; and transferring the caller to another telephone line.

27. The system as in claim 19, further comprising an advertising module operably connected to the intercept module and being adapted to provide at least targeted one advertisement to the caller during the interception of the unsuccessful telephone call, where the at least one advertisement is related to at least one offered good or service.

* * * * *